US012581479B2

(12) United States Patent
Ali et al.

(10) Patent No.: US 12,581,479 B2
(45) Date of Patent: Mar. 17, 2026

(54) INSERTING BEAM SWITCHING GAPS BETWEEN BEAM TRANSMISSIONS

(71) Applicant: Lenovo (Singapore) Pte. Ltd., New Tech Park (SG)

(72) Inventors: Ali Ramadan Ali, Kraiburg am Inn (DE); Ankit Bhamri, Rödermark (DE); Karthikeyan Ganesan, Kronberg im Taunus (DE); Sher Ali Cheema, Ilmenau (DE); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 477 days.

(21) Appl. No.: 18/022,448

(22) PCT Filed: Aug. 23, 2021

(86) PCT No.: PCT/IB2021/057729
§ 371 (c)(1),
(2) Date: Feb. 21, 2023

(87) PCT Pub. No.: WO2022/038583
PCT Pub. Date: Feb. 24, 2022

(65) Prior Publication Data
US 2023/0319816 A1 Oct. 5, 2023

Related U.S. Application Data

(60) Provisional application No. 63/068,900, filed on Aug. 21, 2020.

(51) Int. Cl.
*H04W 72/1263* (2023.01)
*H04B 7/06* (2006.01)
(Continued)

(52) U.S. Cl.
CPC ...... *H04W 72/1263* (2013.01); *H04B 7/0604* (2013.01); *H04W 56/0015* (2013.01); *H04W 72/20* (2023.01)

(58) Field of Classification Search
CPC ............. H04W 72/1263; H04W 72/20; H04W 56/0015; H04B 7/0604; H04B 7/0408;
(Continued)

(56) References Cited

U.S. PATENT DOCUMENTS

2019/0223175 A1 7/2019 Hakola et al.
2021/0289454 A1* 9/2021 Sun ........................ H04L 5/0007
(Continued)

OTHER PUBLICATIONS

PCT/IB2021/057729, "Notification of Transmittal of the International Search Report and the Written Opinion of the International Searching Authority, or the Declaration", International Searching Authority, Nov. 19, 2021, pp. 1-12.
(Continued)

*Primary Examiner* — Candal Elpenord
(74) *Attorney, Agent, or Firm* — Kunzler Needham & Hilton

(57) ABSTRACT

Apparatuses, methods, and systems are disclosed for inserting beam switching gaps between beam transmissions. One apparatus includes a processor that that inserts a gap between contiguous transmissions from a mobile wireless communication network to a user equipment ("UE") device, the contiguous transmissions scheduled on different beams. The apparatus includes a transceiver that indicates to the UE device a type of gap that is inserted between the contiguous transmissions that are scheduled on different beams and indicates to the UE device a number of empty symbols that are used between the contiguous transmissions that are scheduled on different beams.

20 Claims, 12 Drawing Sheets

(51) Int. Cl.
    *H04W 56/00*         (2009.01)
    *H04W 72/20*         (2023.01)

(58) Field of Classification Search
    CPC ... H04L 5/0023; H04L 5/0053; H04L 5/0091;
              H04L 27/2602; H04L 27/26025; H04L
                       27/2607; H04L 27/2613
    USPC ................................................. 370/329–330
    See application file for complete search history.

(56)           References Cited

U.S. PATENT DOCUMENTS

| | | | |
|---|---|---|---|
| 2022/0256375 A1* | 8/2022 | Harada | H04W 72/0446 |
| 2023/0080882 A1* | 3/2023 | Vieira | H04L 5/0053 |
| | | | 375/267 |
| 2023/0155799 A1* | 5/2023 | Shin | H04J 11/0073 |
| | | | 370/329 |

OTHER PUBLICATIONS

Qualcomm Inc., "NR using existing DL/UL NR waveform to support operation between 52.6 GHz and 71 Ghz", 3GPP TSG-RAN WG1 #101-e R1-2004500, May 25-Jun. 5, 2020, pp. 1-16.

Qualcomm, "New WID on Extending current NR operation to 71 GHz", 3GPP TSG RAN Meeting #86 RP-193229, Dec. 9-12, 2019, pp. 1-5.

Intel Corp., "New SID: Study on supporting NR from 52.6GHz to 71 Ghz", 3GPP TSG RAN Meeting #86 RP-193259, Dec. 9-12, 2019, pp. 1-3.

3GPP, "3rd Generation Partnership Project; Technical Specification Group Radio Access Network; Physical layer procedures for shared spectrum channel access (Release 16)", 3GPP TS 37.213 V16.2.0, Jun. 2020, pp. 1-26.

3GPP, "3rd Generation Partnership Project; Technical Specification Group Radio Access Network; NR; User Equipment (UE) radio transmission and reception; Part 1: Range 1 Standalone (Release 16)", 3GPP TS 38.101-1 V16.4.0, Jun. 2020, pp. 1-406.

3GPP, "3rd Generation Partnership Project; Technical Specification Group Radio Access Network; NR; User Equipment (UE) radio transmission and reception; Part 2: Range 2 Standalone (Release 16)", 3GPP TS 38.101-2 V16.4.0, Jun. 2020, pp. 1-172.

3GPP, "3rd Generation Partnership Project; Technical Specification Group Radio Access Network; NR; Base Station (BS) radio transmission and reception (Release 16)", 3GPP TS 38.104 V16.4.0, Jun. 2020, pp. 1-226.

3GPP, "3rd Generation Partnership Project; Technical Specification Group Radio Access Network; NR; Requirements for support of radio resource management (Release 16)", 3GPP TS 38.133 V16.4.0, Jun. 2020, pp. 1-1463.

3GPP, "3rd Generation Partnership Project; Technical Specification Group Radio Access Network; NR; Physical channels and modulation (Release 16)", 3GPP TS 38.211 V16.2.0, Jun. 2020, pp. 1-131.

3GPP, "3rd Generation Partnership Project; Technical Specification Group Radio Access Network; NR; Multiplexing and channel coding (Release 16)", 3GPP TS 38.212 V16.2.0, Jun. 2020, pp. 1-151.

3GPP, "3rd Generation Partnership Project; Technical Specification Group Radio Access Network; NR; Physical layer procedures for control (Release 16)", 3GPP TS 38.213 V16.2.0, Jun. 2020, pp. 1-176.

3GPP, "3rd Generation Partnership Project; Technical Specification Group Radio Access Network; NR; Physical layer procedures for data (Release 16)", 3GPP TS 38.214 V16.2.0, Jun. 2020, pp. 1-163.

3GPP, "3rd Generation Partnership Project; Technical Specification Group Radio Access Network; NR; General aspects for Base Station (BS) Radio Frequency (RF) for NR (Release 15)", 3GPP TS 38.817-02 V15.8.0, Jun. 2020, pp. 1-104.

* cited by examiner

302

> Beam switching time

SSB1                               SSB2

304

> Beam switching time

SSB1                               SSB2

306

> Beam switching time

SSB1                               SSB2

UW/ZT DFT-s-OFDM symbols/UW-OFDM symbols 402 a) Extra CP/UW pre-
appended
502 b) Extra CP/UW post-
appended
504 c) Extra CP/UW pre/post-
appended
506 a) UW generated at the
tail
508 b) UW generated at the
start
510

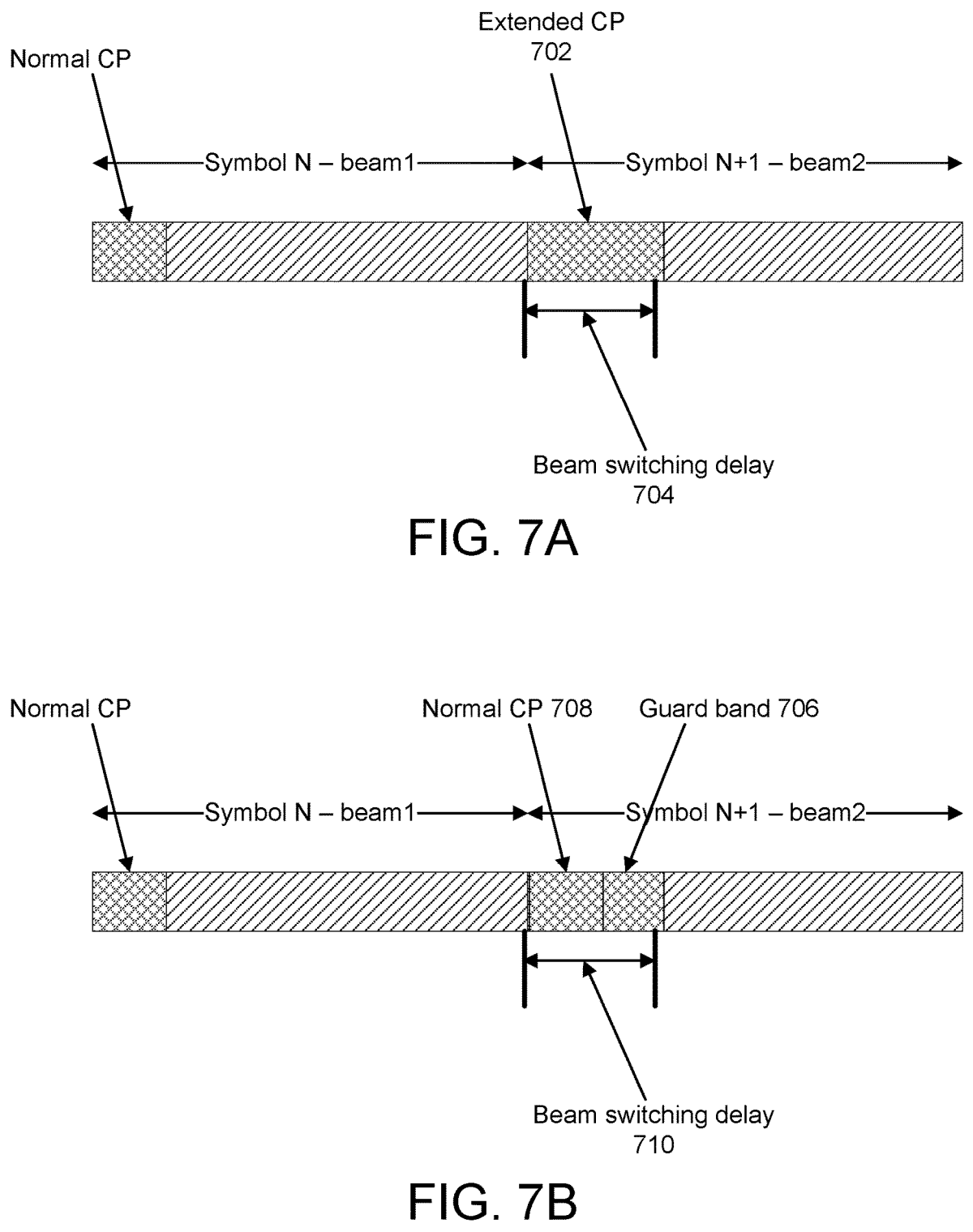

Normal CP

Extended CP
702

←———Symbol N – beam1———→←———Symbol N+1 – beam2———→

Beam switching delay
704

FIG. 7A

Normal CP

Normal CP 708     Guard band 706

←———Symbol N – beam1———→←———Symbol N+1 – beam2———→

Beam switching delay
710

INSERTING BEAM SWITCHING GAPS BETWEEN BEAM TRANSMISSIONS

CROSS-REFERENCE TO RELATED APPLICATIONS

This application claims priority to U.S. Provisional Patent Application No. 63/068,900 entitled "BEAM SWITCHING GAPS FOR SSB SWEEPING AND DATA/CONTROL TRANSMISSIONS FOR HIGH SCS" and filed on Aug. 21, 2020, for Ali Ramadan Ali, et al., which is incorporated herein by reference.

FIELD

The subject matter disclosed herein relates generally to wireless communications and more particularly relates to inserting beam switching gaps between beam transmissions.

BACKGROUND

In certain wireless communication systems, a User Equipment device ("UE") is able to connect with a fifth-generation ("5G") core network (i.e., "5GC") in a Public Land Mobile Network ("PLMN"). In wireless networks, beam switching can be used for data and/or control transmissions.

BRIEF SUMMARY

Disclosed are procedures for inserting beam switching gaps between beam transmissions. Said procedures may be implemented by apparatus, systems, methods, and/or computer program products.

One apparatus of a network device includes a processor that that inserts a gap between contiguous transmissions from a mobile wireless communication network to a user equipment ("UE") device, the contiguous transmissions scheduled on different beams. The apparatus includes a transceiver that indicates to the UE device a type of gap that is inserted between the contiguous transmissions that are scheduled on different beams and indicates to the UE device a number of empty symbols that are used between the contiguous transmissions that are scheduled on different beams.

One apparatus of a UE device includes a transceiver that receives, from a mobile wireless communication network, a type of gap that is inserted between contiguous transmissions that are scheduled on different beams and receives, from the mobile wireless communication network, a number of empty symbols that are used between the contiguous transmissions that are scheduled on different beams. The apparatus includes a processor that uses the type of gap and the number of empty symbols for one of initial access transmissions and data and/or control transmissions that are scheduled on different beams and a length of cyclic prefix is shorter than a delay for switching between the different beams.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7A is a diagram illustrating one example of extended CP applied to only the first symbol when beam switching is done;

FIG. 7B is a diagram illustrating one example of normal CP+guard band applied to starting of first symbol when beam switching is done;

DETAILED DESCRIPTION

Figure 1:
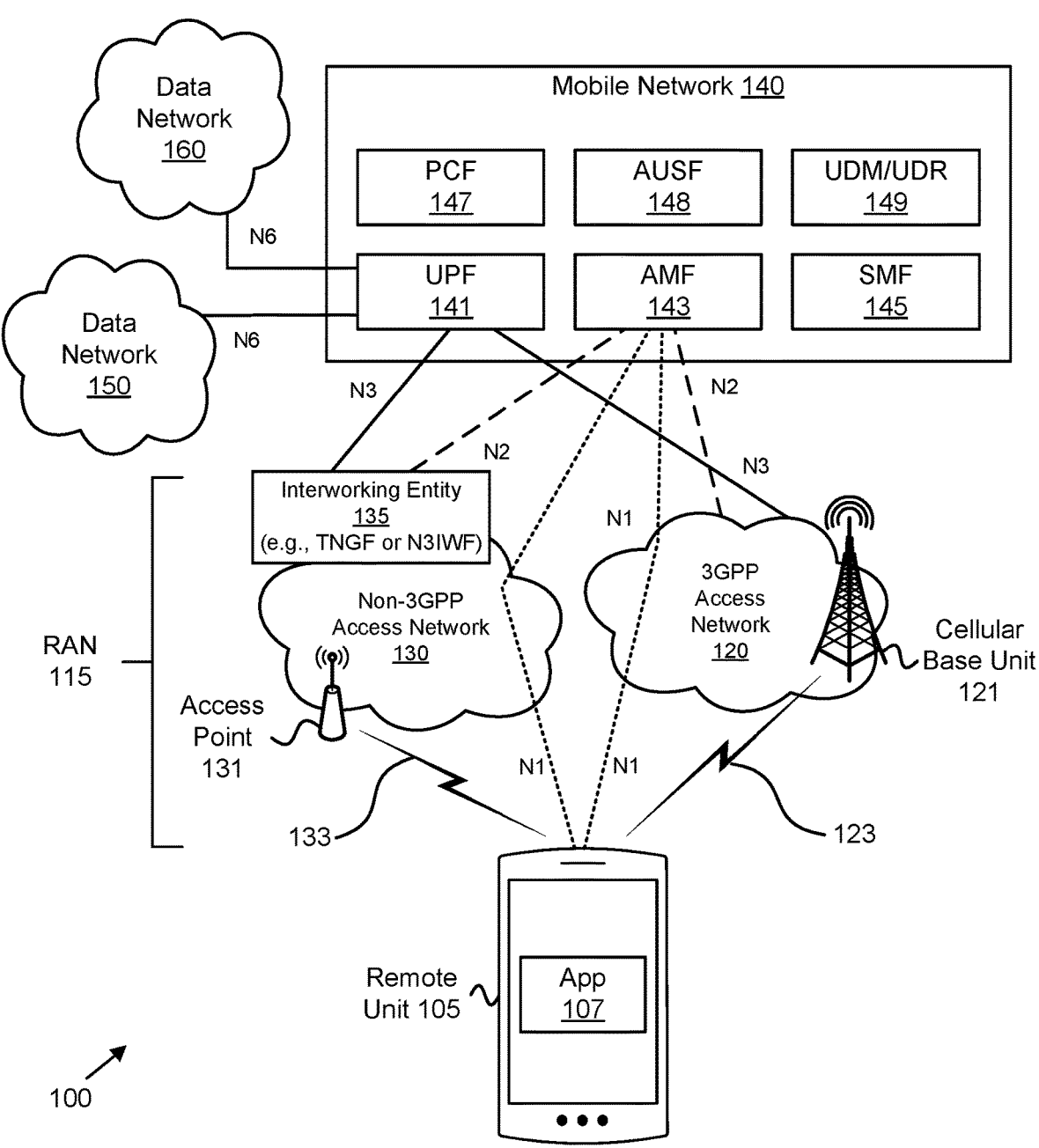
FIG. 1 is a schematic block diagram illustrating one embodiment of a wireless communication system for inserting beam switching gaps between beam transmissions.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for inserting beam switching gaps between beam transmissions. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

FIG. 1 depicts a wireless communication system 100 for inserting beam switching gaps between beam transmissions, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network

140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF")

(which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

In this disclosure, solutions are presented to introduce or adapt the length of a gap between two contiguous transmissions, where the two contiguous transmissions may include synchronization signal block ("SSB") transmissions, type0-physical downlink control channel ("PDCCH") transmissions, and physical downlink shared channel ("PDSCH")-system information block ("SIB") transmissions for initial access or PDSCH transmissions, physical uplink shared channel ("PUSCH") transmissions, PDCCH transmissions, and/or physical uplink control channel ("PUCCH") transmissions for data and/or control transmissions are scheduled or configured on two different beams and the length of a default or configured cyclic prefix is shorter than the required delay for switching between the two beams. In one embodiment, an additional length of gap is introduced or adapted such that the gap, including cyclic prefix ("CP") length, is equal to or greater than the required delay for beam-switching to avoid a completely empty symbol between different contiguous beams, whenever not required.

In one embodiment, a benefit of the proposed solution is to avoid unnecessarily emptying complete symbol(s), avoiding unnecessary latency, and providing efficient resource utilization.

In one embodiment, subcarrier spacing ("SCS") values for frequency range 2 ("FR2") are limited up to 240 KHz for SSB and up to 120 KHz for data channels. For SSB beam switching/sweeping procedures, in certain embodiments, with SCS up to 240 KHz, no time gaps between the contiguous SSB candidates are required and the beam switching occurs during the CP of the next orthogonal frequency division multiplexing ("OFDM") symbol. In one embodiment, the required beam switching time, considering the analogue phase shifters delay, is about 100 ns. For SCS of 240 KHz, the CP may be long enough to handle the beam switching delay. However, in one embodiment, for SCS beyond 52.6 GHz bands, higher SCS values (480 KHz and 960 KHz) are used to avoid phase noise at high frequencies. If these high SCSs are applied to the SSB, in one embodiment, a beam switching issue may arise between the contiguous SSB candidates because the CP length may not be enough for beam switching, and an extra gap may need to be added to prevent downlink ("DL") performance degradation. Furthermore, in some embodiments, similar issues may arise when multiple contiguous transmission occasions, including repetitions or retransmissions, are to be transmitted on different beams and high SCS. The solution proposed herein, considers the issue of beam switching delay when high SCS is used for SSB, CORESET_Type0/PDSCH-SIBs, data/control transmissions, and/or the like.

As background, in one embodiment, multiple SCS values, up to 240 KHz, are currently supported in new radio ("NR") Rel 16. Not all values may be supported, however, for all channel types and there may be a restriction on the configurability of SCS values depending upon channels and frequency range, currently either frequency range 1 ("FR1") or FR2.

In one embodiment, multiple OFDM numerologies are supported, as shown in Table 1, where $\mu$ and the cyclic prefix for a downlink or uplink bandwidth part are obtained from the higher-layer parameter subcarrierSpacing and cyclicPrefix, respectively.

TABLE 1

Supported transmission numerologies.

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding cell search and supported numerologies for SSB, as used herein, cell search is the procedure for a UE to acquire time and frequency synchronization with a cell and to detect the physical layer Cell ID of the cell. In one embodiment, a UE receives the following synchronization signals ("SS") in order to perform cell search—the primary synchronization signal ("PSS") and secondary synchronization signal ("SSS").

A UE, in one embodiment, assumes that reception occasions of a physical broadcast channel ("PBCH"), PSS, and SSS are in consecutive symbols and form an SS/PBCH block. The UE, in further embodiments, assumes that SSS, PBCH demodulation reference signal ("DMRS"), and PBCH data have the same energy per resource element ("EPRE"). The UE may assume that the ratio of PSS EPRE to SSS EPRE in a SS/PBCH block is either 0 dB or 3 dB. In one embodiment, if the UE has not been provided with dedicated higher layer parameters, the UE may assume that the ratio of PDCCH DMRS EPRE to SSS EPRE is within −8 dB and 8 dB when the UE monitors PDCCHs for a DCI format 1_0 with cyclic redundancy check ("CRC") scrambled by system information-radio network temporary identifier ("SI-RNTI"), paging RNTI ("P-RNTI"), or random access RNTI ("RA-RNTI").

I one embodiment, for a half frame with SS/PBCH blocks, the first symbol indexes for candidate SS/PBCH blocks are determined according to the SCS of SS/PBCH blocks as follows, where index 0 corresponds to the first symbol of the first slot in a half-frame:

Case A—15 KHz SCS: the first symbols of the candidate SS/PBCH blocks have indexes of {2, 8}+14·n.

For operation without shared spectrum channel access:

For carrier frequencies smaller than or equal to 3 GHz, n=0, 1.

For carrier frequencies within FR1 larger than 3 GHz, n=0, 1, 2, 3.

For operation with shared spectrum channel access n=0, 1, 2, 3, 4.

Case B—30 KHz SCS: the first symbols of the candidate SS/PBCH blocks have indexes {4, 8, 16, 20}+28·n. For carrier frequencies smaller than or equal to 3 GHz, n=0. For carrier frequencies within FR1 larger than 3 GHz, n=0, 1.

Case C—30 KHz SCS: the first symbols of the candidate SS/PBCH blocks have indexes {2, 8}+14·n.

For operation without shared spectrum channel access

For paired spectrum operation

For carrier frequencies smaller than or equal to 3 GHz, n=0, 1. For carrier frequencies within FR1 larger than 3 GHz, n=0, 1, 2, 3.

For unpaired spectrum operation without shared spectrum channel access

For carrier frequencies smaller than or equal to 2.4 GHz, n=0, 1. For carrier frequencies within FR1 larger than 2.4 GHz, n=0, 1, 2, 3.

For operation with shared spectrum channel access, n=0, 1, 2, 3, 4, 5, 6, 7, 8, 9.

Case D—120 KHz SCS: the first symbols of the candidate SS/PBCH blocks have indexes {4, 8, 16, 20}+28·n. For carrier frequencies within FR2, n=0, 1, 2, 3, 5, 6, 7, 8, 10, 11, 12, 13, 15, 16, 17, 18.

Case E—240 KHz SCS: the first symbols of the candidate SS/PBCH blocks have indexes {8, 12, 16, 20, 32, 36, 40, 44}+56·n. For carrier frequencies within FR2, n=0, 1, 2, 3, 5, 6, 7, 8.

From the above cases, in one embodiment, if the SCS of SS/PBCH blocks is not provided by ssbSubcarrierSpacing, the applicable cases for a cell depend on a respective frequency band. The same case may apply for all SS/PBCH blocks on the cell. In one embodiment, if a 30 kHz SS/PBCH block SCS is indicated by ssbSubcarrierSpacing, Case B applies for frequency bands with 15 KHz SS/PBCH block SCS, and the case specified for 30 KHz SS/PBCH block SCS applies for frequency bands with 30 KHz SS/PBCH block SCS or both 15 KHz and 30 KHz SS/PBCH block SCS. For a UE configured to operate with carrier aggregation over a set of cells in a frequency band of FR2 or with frequency-contiguous carrier aggregation over a set of cells in a frequency band of FR1, in one embodiment, if the UE is provided SCS values by ssbSubcarrierSpacing for receptions of SS/PBCH blocks on cells from the set of cells, the UE expects the SCS values to be same.

The candidate SS/PBCH blocks in a half frame, in one embodiment, are indexed in an ascending order in time from 0 to $\bar{L}_{max}-1$, where, for operation without shared spectrum channel access,
$\bar{L}_{max}=L_{max}$; and for operation with shared spectrum channel access,
$\bar{L}_{max}=10$ for 15 KHz SCS of SS/PBCH blocks, and
$\bar{L}_{max}=20$ for 30 KHz SCS of SS/PBCH blocks In one embodiment, for $\bar{L}_{max}=4$, a UE determines the 2 least significant bits ("LSBs") of a candidate SS/PBCH block index per half frame from a one-to-one mapping with an index of the DM-RS sequence transmitted in the PBCH.

In one embodiment, for $\bar{L}_{max}>4$, a UE determines the 3 LSBs of a candidate SS/PBCH block index per half frame from a one-to-one mapping with an index of the DM-RS sequence transmitted in the PBCH:

for $\bar{L}_{max}=10$, the UE determines the 1 most significant bit ("MSB") of the candidate SS/PBCH block index from PBCH payload bit $$\bar{a}_{\bar{A}+7};$$

for $\bar{L}_{max}=20$, the UE determines the 2 MSBs of the candidate SS/PBCH block index from PBCH payload bits $$\bar{a}_{\bar{A}+6}, \bar{a}_{\bar{A}+7};$$

and for $\bar{L}_{max}=64$, the UE determines the 3 MSB bit of the candidate SS/PBCH block index from PBCH payload bits $$\bar{a}_{\bar{A}+5}, \bar{a}_{\bar{A}+6}, \bar{a}_{\bar{A}+7}.$$

In one embodiment, a UE can be provided per serving cell by ssb-periodicityServingCell a periodicity of the half frames for reception of the SS/PBCH blocks for the serving cell. If the UE is not configured a periodicity of the half frames for receptions of the SS/PBCH blocks, in one embodiment, the UE assumes a periodicity of a half frame. In one embodiment, a UE assumes that the periodicity is same for all SS/PBCH blocks in the serving cell.

For initial cell selection, in one embodiment, a UE may assume that half frames with SS/PBCH blocks occur with a periodicity of 2 frames.

For operation without shared spectrum channel access, in one embodiment, an SS/PBCH block index is the same as a candidate SS/PBCH block index.

For operation with shared spectrum channel access, in one embodiment, a UE assumes that transmission of SS/PBCH blocks in a half frame is within a discovery burst transmission window that starts from the first symbol of the first slot in a half-frame. The UE, in one embodiment, can be provided per serving cell by DiscoveryBurst-WindowLength-r16 a duration of the discovery burst transmission window. If DiscoveryBurst-WindowLength-r16, in one embodiment, is not provided, the UE assumes that the duration of the discovery burst transmission window is a half frame. For a serving cell, the UE, in one embodiment, assumes that a periodicity of the discovery burst transmission window is same as a periodicity of half frames for receptions of SS/PBCH blocks in the serving cell. The UE, in one embodiment, assumes that one or more SS/PBCH blocks indicated by ssb-PositionsInBurst may be transmitted within the discovery burst transmission window and have candidate SS/PBCH blocks indexes corresponding to SS/PBCH block indexes provided by ssb-PositionsInBurst. If MSB k, k≥1, of ssb-PositionsInBurst is set to 1, the UE, in one embodiment, assumes that one or more SS/PBCH blocks within the discovery burst transmission window with candidate SS/PBCH block indexes corresponding to SS/PBCH block index equal to k−1 may be transmitted; if MSB k is set to 0, the UE, in one embodiment, assumes that the SS/PBCH block(s) are not transmitted.

For operation with shared spectrum channel access, a UE, in one embodiment, assumes that SS/PBCH blocks in a serving cell that are within a same discovery burst transmission window or across discovery burst transmission windows are quasi co-located with respect to average gain, QCL-TypeA, and QCL-TypeD properties, when applicable, if a value of $(N_{DM-RS}^{PBCH} \bmod N_{SSB}^{QCL})$ is the same among the SS/PBCH blocks. As used herein, $N_{DM-RS}^{PBCH}$ is an index of a DM-RS sequence transmitted in a PBCH of a corresponding SS/PBCH block, and $N_{SSB}^{QCL}$ is either provided by ssbPositionQCL-Relationship-r16 or, if ssbPositionQCL-Relationship-r16 is not provided, obtained from a MIB provided by a SS/PBCH block according to Table 2. ssbSubcarrierSpacingCommon, in one embodiment, indicates SCS of RMSI only for the case of "operation without shared spectrum." The UE, in one embodiment, assumes that within a discovery burst transmission window, a number of transmitted SS/PBCH blocks on a serving cell is not larger than $N_{SSB}^{QCL}$. The UE, in one embodiment, can determine an SS/PBCH block index according to $(N_{DM-RS}^{PBCH} \bmod N_{SSB}^{QCL})$, or according to $(\bar{\iota} \bmod N_{SSB}^{QCL})$ where $\bar{\iota}$ is the candidate SS/PBCH block index.

TABLE 2

| Mapping between the combination of subCarrierSpacingCommon and [spare or LSB of ssb-SubcarrierOffset] to $N_{SSB}^{QCL}$ | | |
|---|---|---|
| subCarrierSpacingCommon | [spare or LSB of ssb-SubcarrierOffset] | $N_{SSB}^{QCL}$ |
| scs15or60 | 0 | 1 |
| scs15or60 | 1 | 2 |
| scs30or120 | 0 | 4 |
| scs30or120 | 1 | 8 |

Upon detection of a SS/PBCH block, the UE, in one embodiment, determines from MIB that a CORESET for Type0-PDCCH CSS set is present if $k_{SSB} \leq 23$ for FR1 or if $k_{SSB} \leq 11$ for FR2. The UE, in one embodiment, determines from MIB that a CORESET for Type0-PDCCH CSS set is not present if $k_{SSB}$>23 for FR1 or if $k_{SSB}$>11 for FR2; the CORESET for Type0-PDCCH CSS set may be provided by PDCCH-ConfigCommon.

For a serving cell without transmission of SS/PBCH blocks, a UE, in one embodiment, acquires time and frequency synchronization with the serving cell based on receptions of SS/PBCH blocks on the PCell, or on the PSCell, of the cell group for the serving cell.

For beam-based operation, in one embodiment, the base station may employ beam sweeping, transmitting beams in different directions. In one embodiment, 4 beams up to 3 GHz and 8 beams beyond 3 GHz in FR1 may be used. For FR2, in one embodiment, the base station may employ up to 64 beams. With beam sweep operation, in one embodiment, each beam may need to transmit its own SS/PBCH block to allow UE synchronization and enable successful DL and UL data communication.

In one embodiment, SS/PBCH block burst spans 5 m-sec where the base station may transmit SS/PBCH blocks for active beams up to the maximum number of beams according to the operating carrier frequency. Thus, in one embodiment, SS/PBCH blocks for active beams will be confined within a burst of 5 m-sec. The SS/PBCH burst patterns in RAN1 specifications, in one embodiment, provide the symbol indices where the base station will transmit SS/PBCH blocks.

Regarding SSB-Type0-PDCCH multiplexing, in one embodiment, if during cell search a UE determines from MIB that a CORESET for Type0-PDCCH CSS set is present, the UE determines a number of consecutive resource blocks and a number of consecutive symbols for the CORESET of the Type0-PDCCH CSS set from controlResourceSetZero in pdcch-ConfigSIB1 for operation without shared spectrum channel access, or for operation with shared spectrum channel access, and determines PDCCH monitoring occasions from searchSpaceZero in pdcch-ConfigSIB1, included in MIB. In one embodiment, $SFN_C$ and $n_C$ are the SFN and slot index within a frame of the CORESET based on SCS of the CORESET and $SFN_{SSB,i}$ and $n_{SSB,i}$ are the SFN and slot index based on SCS of the CORESET, respectively, where the SS/PBCH block with index i overlaps in time with system frame $SFN_{SSB,i}$ and slot $n_{SSB,i}$. The symbols of the CORESET associated with pdcch-ConfigSIB1 in MIB or with searchSpaceSIB1 in PDCCH-ConfigCommon have normal cyclic prefix.

For operation without shared spectrum channel access, in one embodiment, a UE assumes that the offset is defined with respect to the SCS of the CORESET for Type0-PDCCH CSS set, provided by subCarrierSpacingCommon, from the smallest resource block ("RB") index of the CORESET for Type0-PDCCH CSS set to the smallest RB index of the common RB overlapping with the first RB of the corresponding SS/PBCH block.

For operation with shared spectrum channel access, in one embodiment, a UE determines an offset from a smallest RB index of the CORESET for Type0-PDCCH CSS set to a smallest RB index of the common RB overlapping with a first RB of the corresponding SS/PBCH block:

if the frequency position of the SS/PBCH block corresponds to the global synchronization channel number ("GSCN") of a synchronization raster entry; and according to a sum of a first offset and a second offset, where the first offset is predefined, and the second offset is determined as the difference from the frequency position of the SS/PBCH block provided by ssbFrequency in a measurement configuration associated with a reporting configuration providing reportCGI to the frequency position corresponding to the GSCN of a synchronization raster entry, where the synchronization raster entry is located in the same channel as the SS/PBCH block used for the shared spectrum channel access procedure, if the frequency position of the SS/PBCH block does not correspond to the GSCN of a synchronization raster entry, where the offsets are defined with respect to the SCS of the CORESET for Type0-PDCCH CSS set that is same as the SCS of the corresponding SS/PBCH block.

In one embodiment, for operation without shared spectrum channel access and for the SS/PBCH block and CORESET multiplexing pattern 1, a UE monitors PDCCH in the Type0-PDCCH common search space ("CSS") set over two consecutive slots starting from slot $n_0$.

In one embodiment, for the SS/PBCH block and CORESET multiplexing patterns 2 and 3, a UE monitors PDCCH in the Type0-PDCCH CSS set over one slot with Type0-PDCCH CSS set periodicity equal to the periodicity of SS/PBCH block. In one embodiment, for the SS/PBCH block and CORESET multiplexing patterns 2 and 3, if the active DL bandwidth part ("BWP") is the initial DL BWP, the UE is expected to be able to perform radio link monitoring, and measurements for radio resource management using an SS/PBCH block that provides a CORESET for Type0-PDCCH CSS set. In one embodiment, for an SS/PBCH block with index, the UE determines the slot index based on predefined parameters.

In this disclosure, solutions are presented to introduce or adapt the length of a gap between two contiguous transmissions, where the two contiguous transmissions may include SSB transmissions, type0-PDCCH transmissions, and PDSCH-SIB transmissions for initial access or PDSCH transmissions, PUSCH transmissions, PDCCH transmissions, and/or PUCCH transmissions for data and/or control transmissions are scheduled or configured on two different beams and the length of a default or configured cyclic prefix is shorter than the required delay for switching between the two beams. In one embodiment, an additional length of gap is introduced or adapted such that the gap, including CP length, is equal to or greater than the required delay for beam-switching to avoid a completely empty symbol between different contiguous beams, whenever not required.

In one embodiment, a benefit of the proposed solution is to avoid unnecessarily emptying complete symbol(s), avoiding unnecessary latency, and providing efficient resource utilization.

In a first embodiment, if SSB SCS and the corresponding switching time gaps for SSB sweeping are not provided by higher layers (ssbSubcarrierSpacing, ssbBeamSwitchingGap), the SCS used for SSB and the corresponding switching gaps can follow the operating frequency bands, similar to FR2. Tables used for FR2 can be defined with the new SCS values and extra entries for the corresponding beam switching gaps.

In one embodiment, the gNB inserts these gaps between the neighbor/adjacent SSB candidates e.g., for case D or case E, or between neighbor/adjacent CORESET_type0/Type0-PDCCH monitoring occasions corresponding to different SSBs (e.g., in case of multiplexing pattern 1 or 2) or between neighbor/adjacent CORESET_type0/Type0-PDCCH monitoring occasions corresponding to a first SSB and a second SSB transmission (e.g., in case of multiplexing pattern 2). The UE, in one embodiment, if not configured with higher layers parameters (ssbSubcarrierSpacing, ssb- BeamSwitchingGap), uses combination of SCS/operating band in the table and tries the possible SCS values for that band.

In one embodiment, the beam switching gap is directly associated with the SCS used for SSB. In such an embodiment, the UE determines the SCS value. In another embodiment, the beam switching gap is not directly associated with the SCS. In such an embodiment, the switching gap is signaled separately to the UE. In one example embodiment, PSS sequence carries information about the gap. In another example embodiment, DMRS sequence of PBCH carries this information. In another example embodiment, information regarding the switching gap is conveyed (e.g., based on a sequence or modulated (e.g., quadrature phase shift keying ("QPSK")) symbols) on at least one reserved subcarrier around (on either side in frequency domain) of the PSS and/or SSS (e.g., 9/8 subcarriers adjacent to the PSS or SSS).

In one embodiment, the beam switching gap value is the same for all gaps. In another embodiment, the beam switching gap value is different for at least two gaps. In another embodiment, the switching gap is created by the UE by not receiving the last part of a symbol immediately preceding the first symbol of the SSB/CORESET_type0/Type0-PDCCH monitoring occasion. In another embodiment, the switching gap may also be created by the UE by not receiving the first part of a symbol subframe immediately following the first symbol of the SSB/CORESET_type0/Type0-PDCCH monitoring occasion.

In another embodiment with new higher SCS Type0-PDCCH/CORESET_type0, additional candidate SSB locations (e.g., on slots not already containing candidate SSB locations for the legacy SSB SCS) may be defined within a synchronization signal ("SS") burst set (the set of SSBs within a beam-sweep). In another embodiment, instead of each SS burst set being confined to a 5 ms time interval either in the first or second half of a 10 ms frame, an SS burst set can be confined to a 10 ms time interval in both half-frames of a 10 ms frame. In one embodiment, at least one switching gap (e.g., one symbol gap at CORESET_type0 SCS) is inserted between neighbor/adjacent CORESET_type0/Type0-PDCCH monitoring occasions (e.g., in case of multiplexing pattern 1 or 2) and/or PDSCH-SIB corresponding to different SSBs.

Figure 2:
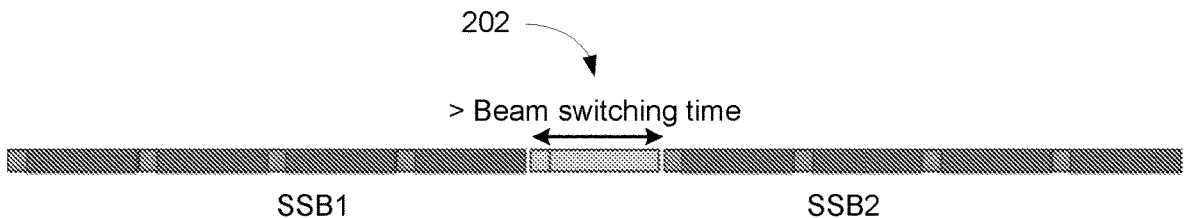
FIG. 2 is a diagram illustrating one embodiment of leaving empty OFDM symbol(s) between the SSBs and between CORESET_Type0/PDSCH-SIBs occasions.
Figure 2:
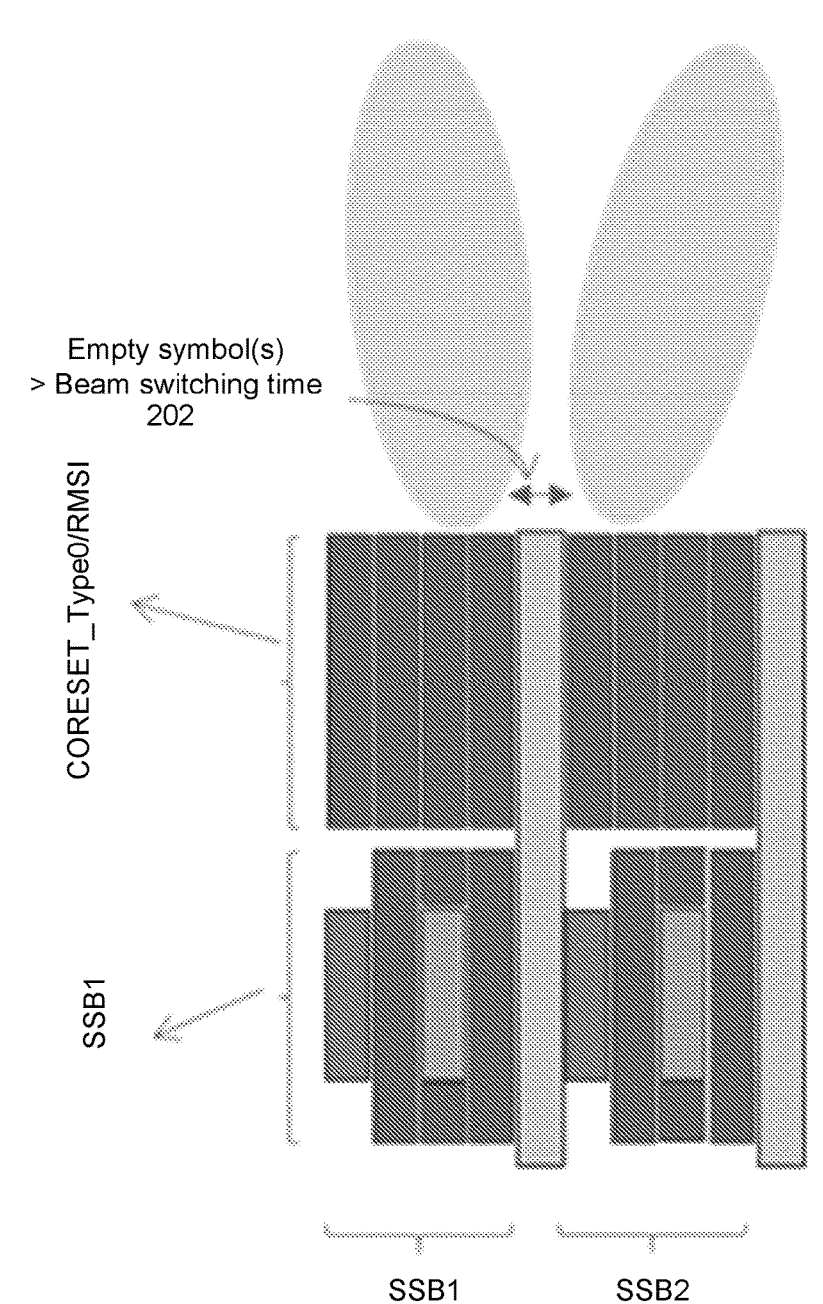

In a second embodiment, as shown in FIG. 2, an additional gap 202 is introduced between the two SSB beams, where the gap length can be dependent up on the SCS value determined for the SSB transmission.

In one implementation of the second embodiment, one or more OFDM symbols are left empty between the contiguous SSBs in time (or between neighbor/adjacent CORESET_type0/Type0-PDCCH monitoring occasions corresponding to different SSBs (e.g., in case of multiplexing pattern 1 or 2) or between neighbor/adjacent CORESET_type0/Type0-PDCCH monitoring occasion corresponding to a first SSB and a second SSB transmission (e.g., in case of multiplexing pattern 2)), the number of blank OFDM symbols depends on the SCS used for SSB in case of multiplexing pattern 1 and in another implementation, the beam switching gap is dependent on the SCS used for both SSB and CORESET_type0/PDSCH-SIB when multiplexing pattern 2 or 3 is used.

In another embodiment, the UE, if not configured with higher layers parameters (ssb-PositionsInBurst, ssbSubcarrierSpacing, ssbBeamSwitchingGap), uses a combination of SCS/operating band in the table and tries the possible SCS values for that band.

In another embodiment, the beam switching gap in terms of a number of empty OFDM symbols in-between SSBs is directly associated with the SCS used for SSB. In another embodiment, the number of OFDM symbols is not directly associated with the SCS, but the number of empty OFDM symbols is signaled separately to the UE, either using PSS sequence or DMRS sequence of PBCH. In another embodiment, information regarding the number of empty OFDM symbols is conveyed (e.g., based on a sequence or modulated (e.g., QPSK) symbols) on at least one reserved subcarrier around (on top and bottom) of the PSS and/or SSS (e.g., 9/8 subcarriers adjacent to the PSS or SSS). In one implementation, the number of empty OFDM symbols is the same for all gaps. In another embodiment, the number of empty OFDM symbols value is different for at least two gaps.

Figure 3A:
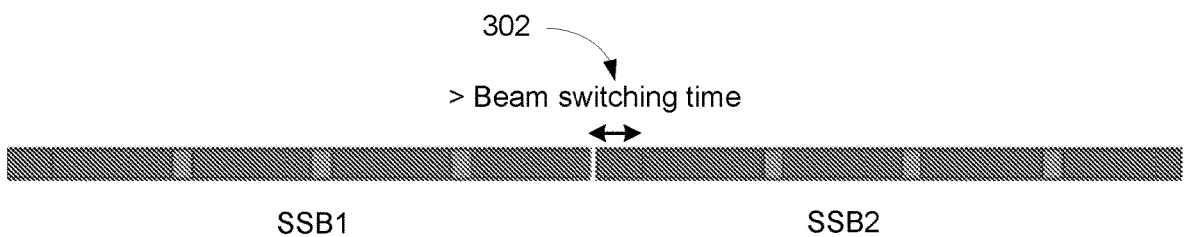
FIG. 3A is a diagram illustrating one embodiment of using extended CP for first OFDM symbol of the SSB.
Figure 3B:
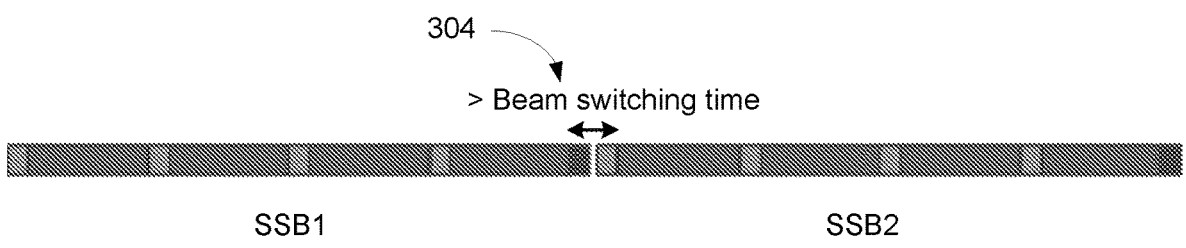
FIG. 3B is a diagram illustrating one embodiment of using cyclic post-fix for the last OFDM symbol of the SSB.

In a third embodiment, extended CP is used to accommodate the beam switching time. In one embodiment, the extended CP is used for the first OFDM symbol 302 of the SSB in case of multiplexing pattern 1, or the first OFDM symbol of SSB/CORESET_type0 in case of multiplexing pattern 3, or the first OFDM symbol of CORESET_type0 (and possibly additionally the first OFDM symbol of SSB if there is at least a symbol gap between the end of the CORESET_type0 (e.g., last symbol) and the first OFDM symbol of SSB) in case of multiplexing pattern 2. In another embodiment, a cyclic post-fix is added to the last OFDM symbol 304 of the SSB (and/or CORESET_type0) and the last PDSCH-SIB symbol in case of multiplexing pattern 2/3 as illustrated in FIGS. 3A and 3B. In one embodiment, the type of the inserted CP depends on the used SCS for SSB or for both SSB and CORESET_type0 when multiplexing patterns 2 or 3 are used. In some embodiments, a prefix/extended CP is used that corresponds to a first SSB and a post-fix is used that corresponds to a second SSB.

Figure 3C:
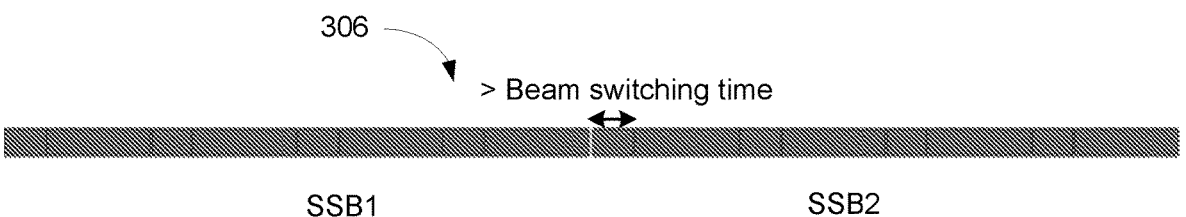
FIG. 3C is a diagram illustrating one embodiment of using extended CP for all OFDM symbol of the SSB.

In another embodiment, shown in FIG. 3C, extended CP is used for all OFDM symbols 306 in the slot. The UE, in one embodiment, if not configured with higher layer parameters (ssbSubcarrierSpacing, ssbBeamSwitchingGap), uses a combination of SCS/operating band in the table and tries the possible SCS values for that band.

In one embodiment, the type of the inserted CP is directly associated with the SCS value used for SSB. In such am embodiment, the UE determines the SCS value. In another embodiment, the type of CP is not directly associated with the SCS. In such an embodiment, the CP type is signaled separately to the UE either using PSS sequence or DMRS sequence of PBCH. In another embodiment, information regarding the type of CP is conveyed (e.g., based on a sequence or modulated (e.g., QPSK) symbols) on at least one reserved subcarrier around (on top and bottom) of the PSS and/or SSS (e.g., 9/8 subcarriers adjacent to the PSS or SSS). In one embodiment, the type of CP is same for all gaps. In another embodiment, the type of CP value is different for at least two gaps.

Figure 4:
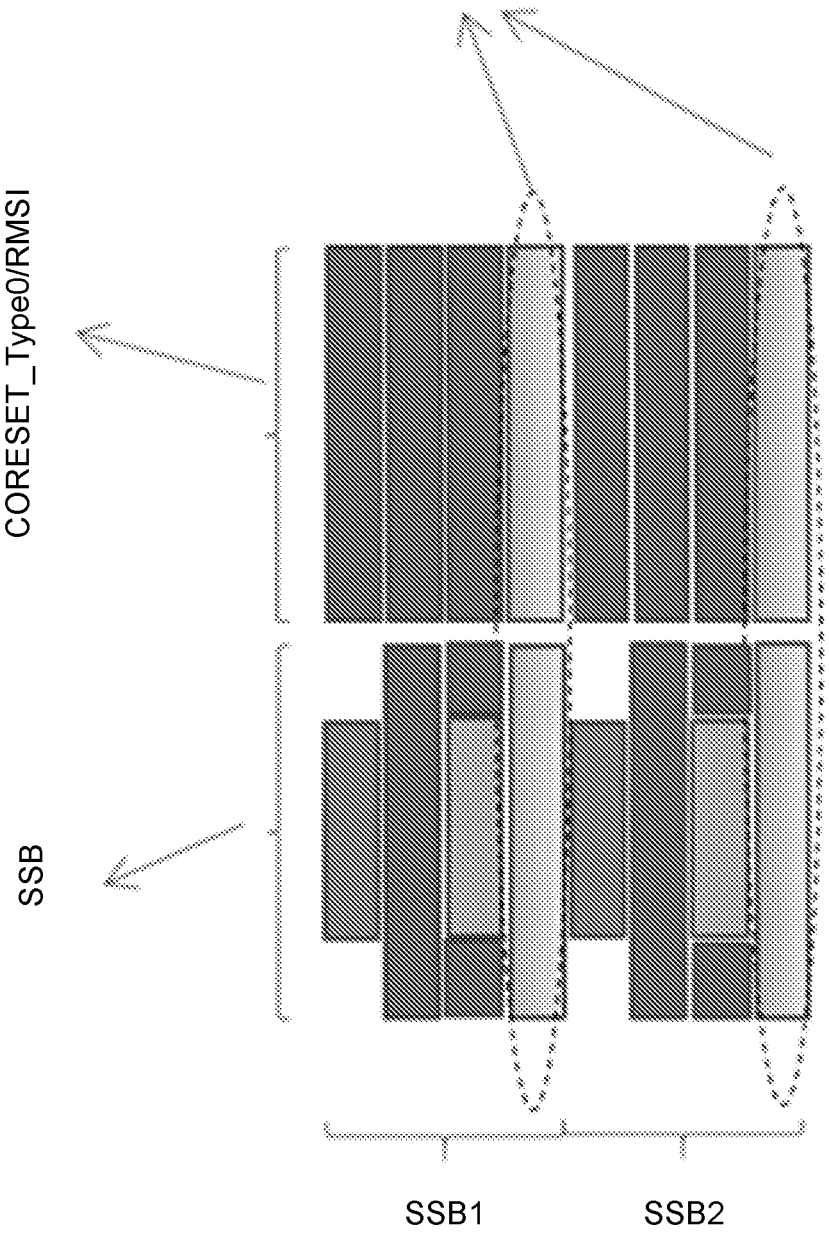
FIG. 4 is a diagram illustrating one embodiment of Last SSB/PDSCH-SIB symbol generation with different waveform.

In a fourth embodiment, to reduce the spectral efficiency loss due to the extended CP as illustrated in FIG. 3C and to avoid the time mismatch due to different OFDM symbol lengths, the last symbol 402 of the SSB is generated with a waveform that has the ability to utilize flexible guard interval ("GI") inside the inverse fast Fourier transform ("IFFT") window, as shown in FIG. 4 in case of multiplexing pattern 3. As the symbol length is kept the same as other OFDM symbols, in one embodiment, it gives a cushion of CP length duration between two SSB, thus allowing for an extra time for beam switching. This flexibility, in one embodiment, allows the use of SCS even higher than 960 KHz without time mismatch and allows smooth backward compatibility.

Figure 5A:
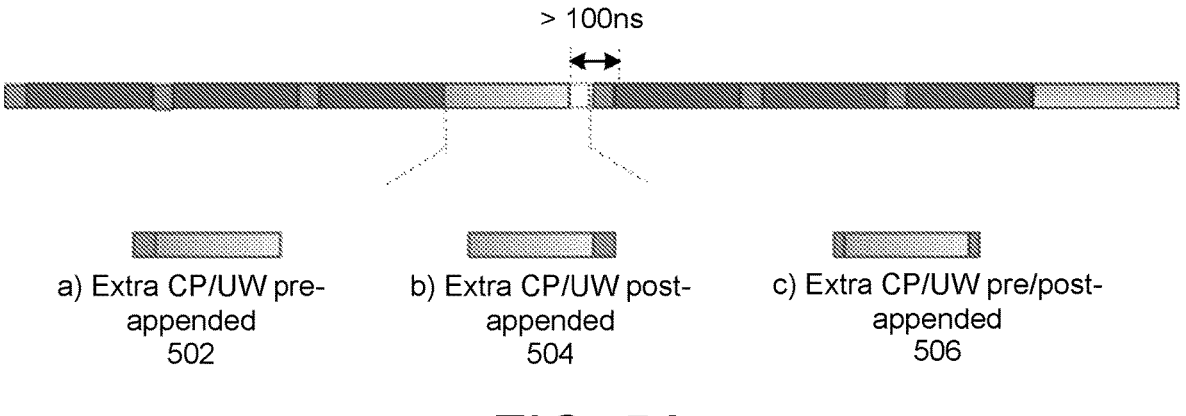
FIG. 5A is a diagram illustrating one embodiment of ZT/UW-DFT-s-OFDM based last symbol generation.

In one embodiment, variants of single carrier DFT-s-OFDM schemes such as zero-tail ("ZT") DFT-s-OFDM or unique word ("UW") DFT-s-OFDM are used for last symbol generation. In one embodiment, depending upon the frame structure, SCS, and symbol generation, an extra CP/UW of a same duration as of a CP of other OFDM symbol is pre-appended 502, post-appended 504, or even a combination of both 506, as illustrated in FIG. 5A.

Figure 5B:
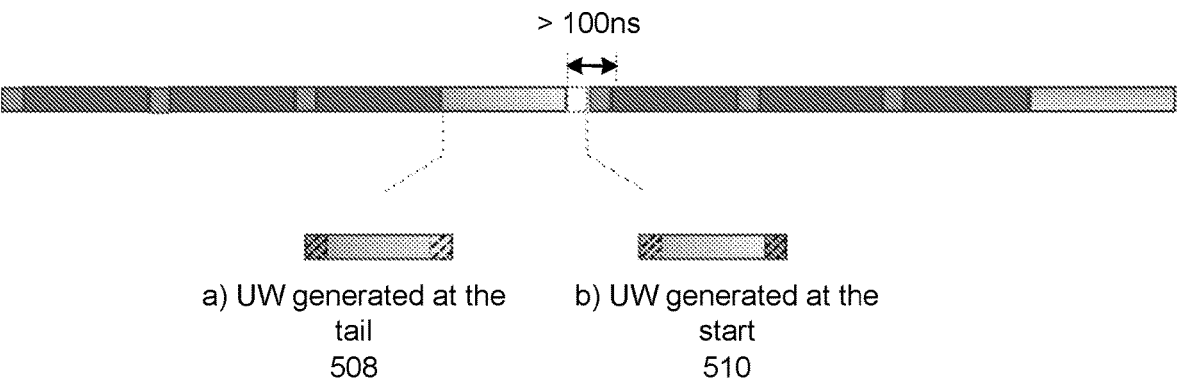
FIG. 5B is a diagram illustrating one embodiment of UW-OFDM based last symbol generation.

In one embodiment, as shown in FIG. 5B, UW-OFDM is used for last symbol generation. A known matrix may be applied in the frequency domain to generate zero UW at the output of IFFT. If this matrix is an identity matrix, in one embodiment, conventional OFDM symbols are generated, thus offering additional flexibility to generate either OFDM or UW-OFDM symbols for different SCS values. Depending upon whether zero UWs are generated at the tail or at the start, in one embodiment, an additional UW is pre-appended 508 or post-appended 510 to achieve the circularity.

In one embodiment, if the UE is not configured with higher layer parameters (ssbSubcarrierSpacing, ssbBeam-SwitchingGap), the type of the waveform (e.g., whether it is ZT/UW-DFT-s-OFDM or UW-OFDM) used for the last SSB symbol can be either directly associated with the SCS value used for SSB or signaled separately to the UE by using PSS sequence or DMRS sequence of PBCH. In one embodiment, the loss of PBCH/RMSI (PDSCH-SIB) payload due to the GI inside the FFT window can be compensated by using front loaded DMRS or even with UW, which is suitable for high SCS.

In another embodiment, information regarding the type of waveform is conveyed (e.g., based on a sequence or modulated (e.g., QPSK) symbols) on at least one reserved subcarrier around (on top and bottom) of the PSS and/or SSS (e.g., 9/8 subcarriers adjacent to the PSS or SSS). In one embodiment, the type of waveform is the same for all gaps. In another embodiment, the type of waveform value is different for at least two gaps.

Figure 6:
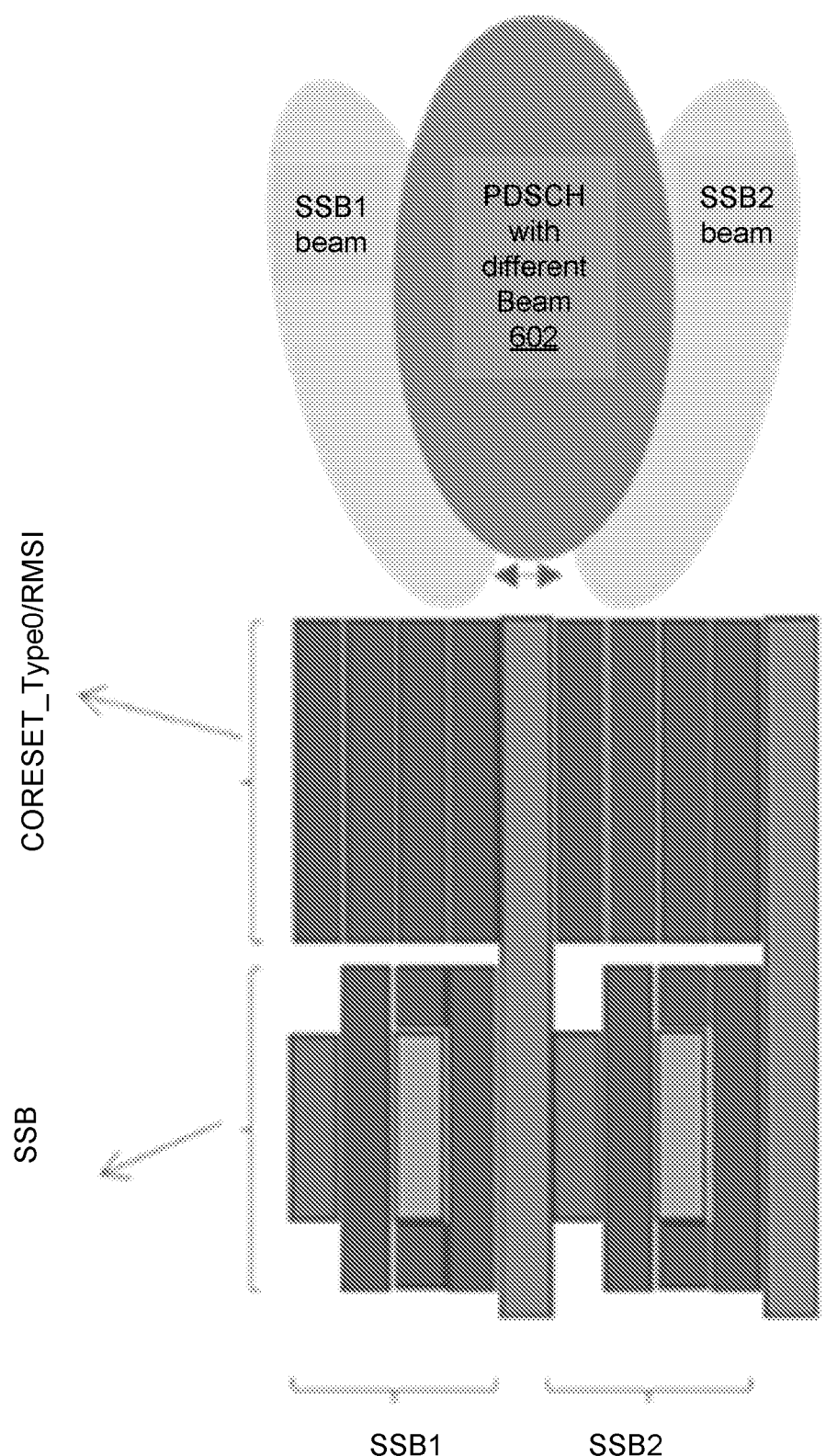
FIG. 6 is a diagram illustrating one embodiment of scheduling PDSCH transmission between SSBs.

In a fifth embodiment, illustrated in FIG. 6, if the gNB is capable of multibeam operation or supporting multiple RF chains, then instead of leaving empty OFDM symbols or switching gap symbol/time between the contiguous SSBs as part of beam switching gap, time domain multiplexing of PDSCH and SSB could be used where gNB could schedule PDSCH between SSBs 602.

In a sixth embodiment, the blank symbols between SSBs could be configured as an UL symbol. In one embodiment, the gNB could configure slot format indicators ("SFI") such that a UL symbol could be inserted between SSBs.

In another embodiment, a UE capable of multibeam operation could receive SSBs without the need of a beam switching gap using a plurality of receive beams, whereas a UE not capable of multi beam operation could receive SSBs using the same receive beam at a different time instant, hence a UE may be configured to skip one or more SSBs for this purpose depending on the beam switching delay. In one embodiment, a UE could be configured in a first SSB burst to monitor SSB #0, SSB #2, SSB #4, and so on while skipping SSB #1, SSB #3, SSB #5, and so on, and in the second SSB burst the UE could be configured to monitor SSB #1, SSB #3, SSB #5, and so on while skipping SSB #0, SSB #2, SSB #4, and so on.

In a seventh embodiment, when at least two contiguous data/control transmissions are scheduled and each of the transmission occasions is using a different beam, and if the default/configured cyclic prefix length is not sufficient to accommodate the beam switching delay, then an additional gap is introduced between the two beams such the total gap becomes equal to or greater than the beam switching delay.

In one implementation of embodiment 7, when multiple PDSCH/PUSCH/PDCCH/PUCCH transmissions/repetitions/retransmissions are contiguously scheduled on different beams, then a cyclic prefix length 702 longer than the default cyclic prefix length can be expected to be applied at the first symbol of the following transmission occasion such that the increased length is equal to or greater than the beam switching delay 704. An example is illustrated in FIG. 7A.

In another implementation of embodiment 7, when multiple PDSCH/PUSCH/PDCCH/PUCCH transmissions/repetitions/retransmissions are contiguously scheduled on different beams, then at least one guard band 706 at the starting of the first symbol of the following transmission occasion is added such that total length of the guard band 706 and CP length 708 is equal to or greater than the beam switching delay 710 and the data/control transmission is rate-matched on remaining subcarriers of the first symbol. An example is illustrated in FIG. 7B.

Figure 7C:
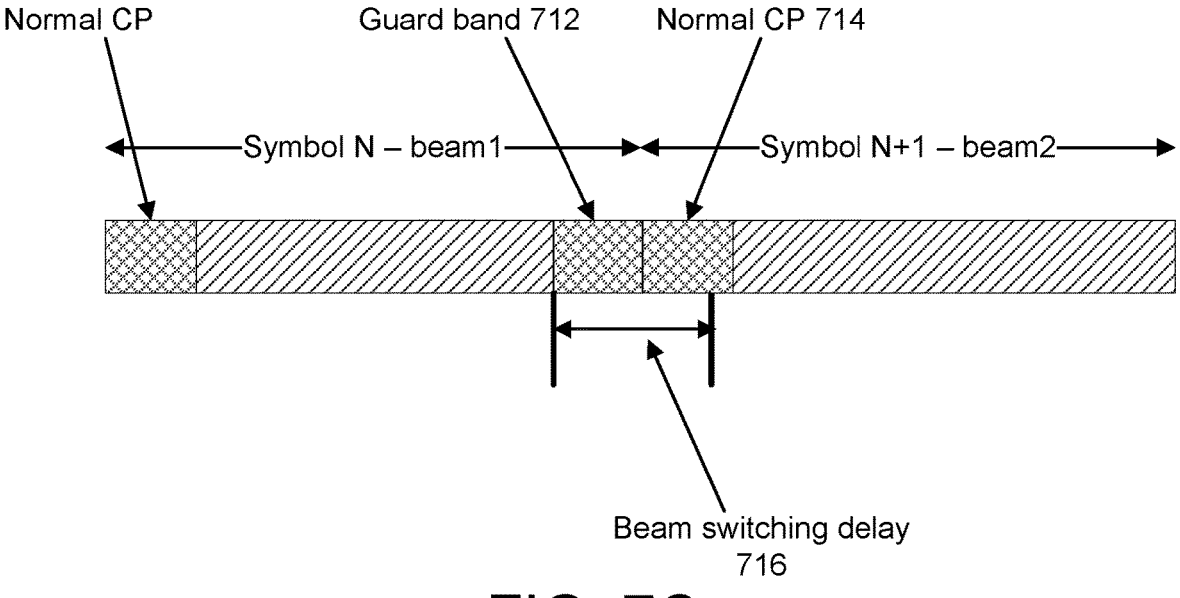
FIG. 7C is a diagram illustrating one example of normal CP+guard band applied to end of last symbol when beam switching is done.

In another implementation of embodiment 7, when multiple PDSCH/PUSCH/PDCCH/PUCCH transmissions/repetitions/retransmissions are contiguously scheduled on different beams, then at least one guard band 712 at the end of the last symbol of the previous transmission occasion is added such that total length of the guard band 712 and CP length 714 for the following symbol is equal to or greater than the beam switching delay 716 and the data/control transmission is rate-matched on remaining subcarriers of the last symbol. An example is illustrated in FIG. 7C.

Figure 7D:
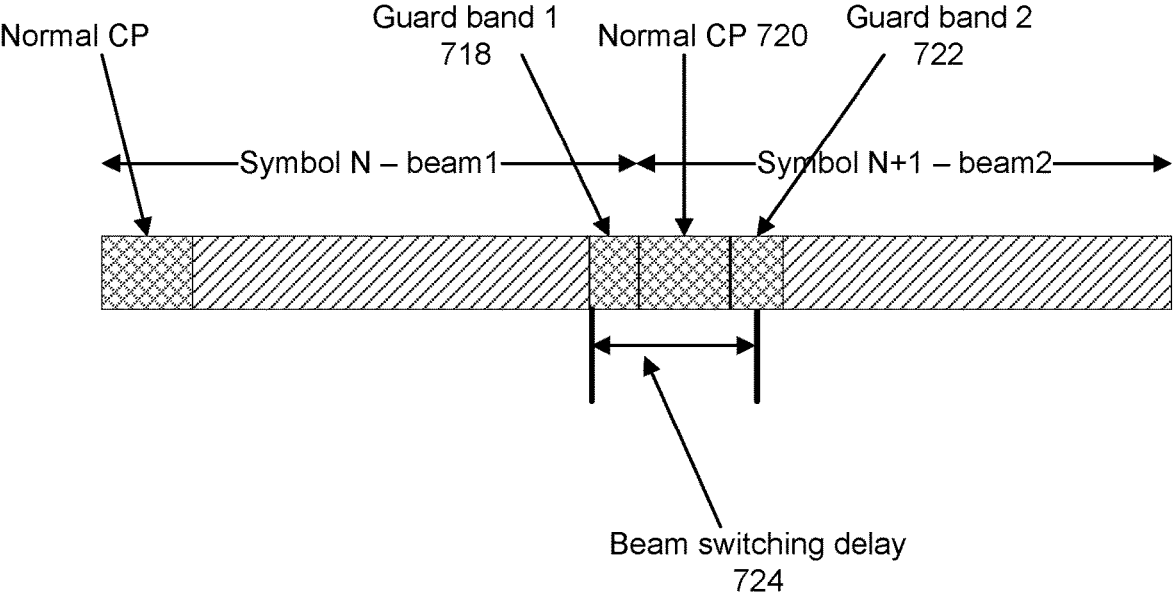
FIG. 7D is a diagram illustrating one example of normal CP+guard bands applied to both the end of last symbol and start of first symbol when beam switching is done.

In another implementation of embodiment 7, when multiple PDSCH/PUSCH/PDCCH/PUCCH transmissions/repetitions/retransmissions are contiguously scheduled on different beams, then at least one guard band 718 at the end of the last symbol of the previous transmission occasion is added and at least one guard band 722 at the starting of the first symbol of the following transmission occasion is added such that total length of guard bands 718, 722 on both symbols and CP length 720 for the following symbol is equal to or greater than the beam switching delay 724 and the data/control transmission is rate-matched on remaining subcarriers of the last symbol of a previous transmission and the first symbol of a following transmission. An example is illustrated in FIG. 7D.

In an eighth embodiment, when at least two contiguous data/control transmissions are scheduled in NR-U and each of the transmission occasions is using a different beam, and if the default/configured cyclic prefix length is not sufficient to accommodate the beam switching delay, then extended cyclic prefix length is expected to be used such that total length is equal to or greater than the beam switching delay. The length of the extended cyclic prefix may be associated with the configured SCS value.

In one embodiment, when at least two contiguous data/control transmissions are scheduled in NR-U and each of the transmission occasion is using a different beam, and if the default/configured cyclic prefix length is not sufficient to accommodate the beam switching delay, then one or more symbol gaps are introduced such the length of the gap is sufficient to accommodate the beam switching delay, but shorter than the duration above which listen-before-talk ("LBT") might be needed according to regulatory requirements. If the required symbol gap to accommodate the beam switching delay is expected to be longer than the threshold gap for performing LBT, then only extended CP is used depending upon the SCS value.

To summarize, in one embodiment, the foregoing proposed solutions present a new time domain mapping of SSBs, allowing a guard of empty symbols between the contiguous SSB candidates for beam switching when high SCS is used. In further embodiments, a new DL frame structure is proposed that adds different types of CPs to some or all of the OFDM symbols in SSB slots:

a) Using extended CP for the first OFDM symbol used for SSB in case of multiplexing pattern 1 or for both SSB/type0_PDCCH in case of multiplexing pattern 3;

b) Using cyclic post-fix for the last OFDM symbol used for SSB in case of multiplexing pattern 1, or for both SSB/PDSCH-SIB in case of multiplexing pattern 2/3;

c) Using extended CP for all OFDM symbols in the slots where SSB is present; and/or d) Changing the number of OFDM symbols in the slot such that the slot length is kept the same In some embodiments, different waveforms (e.g., ZT/UW-DFT-s-OFDM/UW-OFDM) can be used for the first OFDM symbol that is used for SSB/type0_PDDCH in case of multiplexing pattern 3 and/or for the last OFDM symbol used for SSB/PDSCH-SIB in case of multiplexing pattern 2/3.

In one embodiment, an RRC configuration parameter (e.g., ssbBeamSwitchingGap) is used for indicating to the UE the type and length of the used beam switching gap. In one embodiment, the proposed solution signals the gap information in PSS, PBCH-DMRS, or UW if the beam switching is not provided by higher layers. In certain embodiments, the proposed solution inserts additional gaps either by leaving empty OFDM symbols or extending the CP when multiple PDSCH/PUSCH/PDCCH/PUCCH transmissions/repetitions/retransmissions are contiguously scheduled on different beams.

Figure 8:
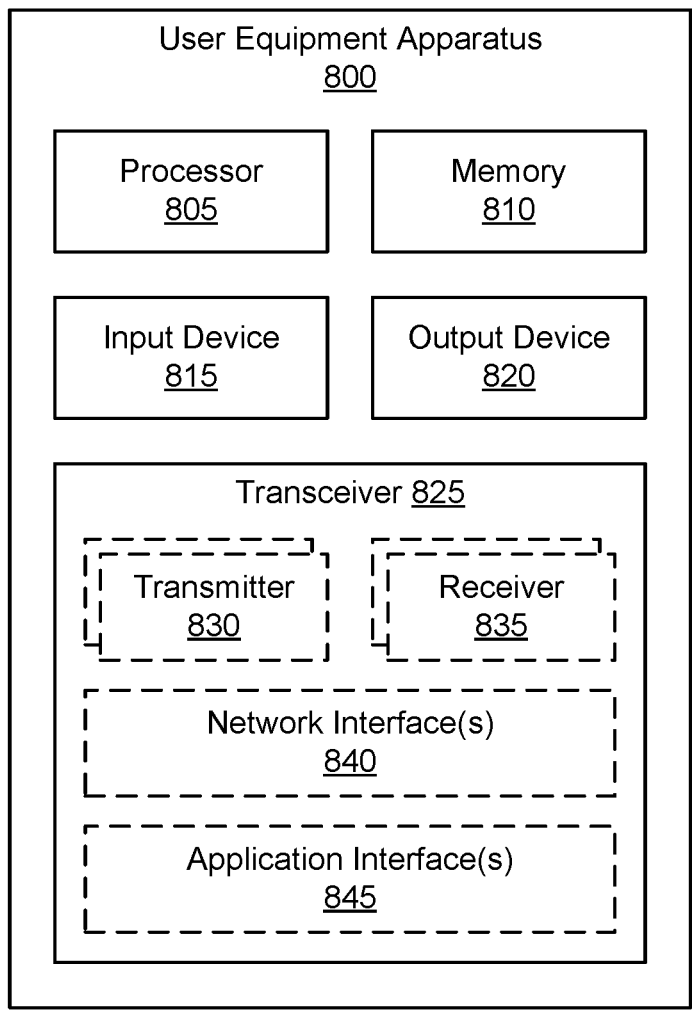
FIG. 8 is a block diagram illustrating one embodiment of a user equipment apparatus that may be used for inserting beam switching gaps between beam transmissions.

FIG. 8 depicts a user equipment apparatus 800 that may be used for inserting beam switching gaps between beam transmissions, according to embodiments of the disclosure. In various embodiments, the user equipment apparatus 800 is used to implement one or more of the solutions described above. The user equipment apparatus 800 may be one embodiment of the remote unit 105 and/or the UE 205, described above. Furthermore, the user equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. In some embodiments, the transceiver 825 communicates with one or more cells (or wireless coverage areas) supported by one or more base units 121. In various embodiments, the transceiver 825 is operable on unlicensed spectrum. Moreover, the transceiver 825 may include multiple UE panel supporting one or more beams. Additionally, the transceiver 825 may support at least one network interface 840 and/or application interface 845. The application interface(s) 845 may support one or more APIs. The network interface(s) 840 may support 3GPP reference points, such as Uu, N1, PC5, etc. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825. In certain embodiments, the processor 805 may include an application processor (also known as "main processor") which manages application-domain and operating system ("OS") functions and a baseband processor (also known as "baseband radio processor") which manages radio functions.

In various embodiments, the processor 805 and/or the transceiver 825 control the user equipment apparatus 800 to implement the above described UE behaviors. For example, the transceiver 825 receives, from a mobile wireless communication network, a type of gap that is inserted between contiguous transmissions that are scheduled on different beams and receives, from the mobile wireless communication network, a number of empty symbols that are used between the contiguous transmissions that are scheduled on different beams. In one embodiment, the processor 805 uses the type of gap and the number of empty symbols for one of initial access transmissions and data and/or control transmissions that are scheduled on different beams and a length of cyclic prefix is shorter than a delay for switching between the different beams.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to inserting beam switching gaps between beam transmissions. For example, the memory 810 may store various parameters, panel/beam configurations, resource assignments, policies, and the like as described above. In certain embodiments, the memory 810 also stores program code and related data, such as an operating system or other controller algorithms operating on the user equipment apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver 825 (or portions thereof) at particular times in order to send and receive messages.

The transceiver 825 includes at least transmitter 830 and at least one receiver 835. One or more transmitters 830 may be used to provide UL communication signals to a base unit 121, such as the UL transmissions described herein. Similarly, one or more receivers 835 may be used to receive DL communication signals from the base unit 121, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an ASIC, or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
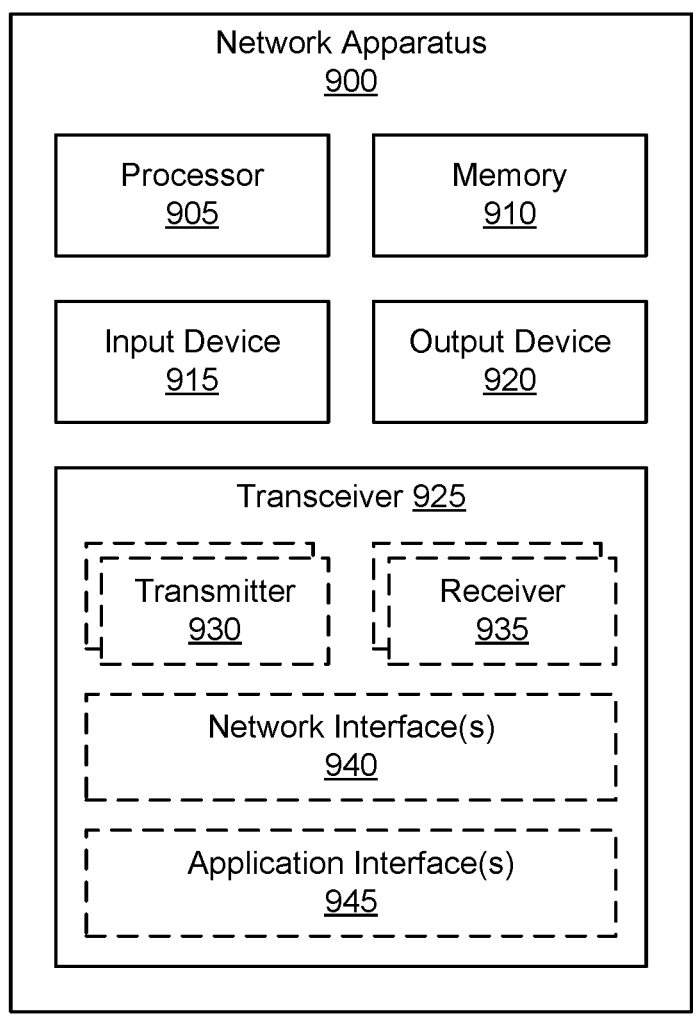
FIG. 9 is a block diagram illustrating one embodiment of a network apparatus that may be used for inserting beam switching gaps between beam transmissions.

FIG. 9 depicts a network apparatus 900 that may be used for inserting beam switching gaps between beam transmissions, according to embodiments of the disclosure. In one embodiment, network apparatus 900 may be one implementation of a RAN node, such as the base unit 121, the RAN node 210, or gNB, described above. Furthermore, the base network apparatus 900 may include a processor 905, a memory 910, an input device 915, an output device 920, and a transceiver 925.

In some embodiments, the input device 915 and the output device 920 are combined into a single device, such as a touchscreen. In certain embodiments, the network apparatus 900 may not include any input device 915 and/or output device 920. In various embodiments, the network apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. The application interface(s) 945 may support one or more APIs. The network interface(s) 940 may support 3GPP reference points, such as Uu, N1, N2 and N3. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925. In certain embodiments, the processor 805 may include an application processor (also known as "main processor") which manages application-domain and operating system ("OS") functions and a baseband processor (also known as "baseband radio processor") which manages radio function.

In various embodiments, the network apparatus 900 is a RAN node (e.g., gNB), or other network device, that includes a processor 905 and a transceiver 925. In such embodiments, the processor 905 inserts a gap between contiguous transmissions from a mobile wireless communication network to a user equipment ("UE") device, the contiguous transmissions scheduled on different beams. In one embodiment, the transceiver 925 indicates to the UE device a type of gap that is inserted between the contiguous transmissions that are scheduled on different beams and indicates to the UE device a number of empty symbols that are used between the contiguous transmissions that are scheduled on different beams.

In one embodiment, the processor 905 performs time domain mapping of synchronization signal blocks ("SSBs") where a guard interval of orthogonal frequency division multiplexing ("OFDM") symbols between contiguous SSB candidates remain empty for beam switching when high subcarrier spacing ("SCS") is used.

In one embodiment, the processor 905 modifies a downlink frame structure by adding different types of cyclic prefixes ("CPs") to at least one orthogonal frequency division multiplexing ("OFDM") symbol in synchronization signal block ("SSB") slots.

In one embodiment, the processor 905 uses an extended cyclic prefix ("CP") for a first orthogonal frequency division multiplexing ("OFDM") symbol of one or more of synchronization signal block ("SSB") transmissions and type0-physical downlink control channel ("PDCCH") transmissions in response to multiplexing pattern 3 being used.

In one embodiment, the processor 905 uses cyclic post-fix for a last orthogonal frequency division multiplexing ("OFDM") symbol of one or more of synchronization signal block ("SSB") transmissions and physical downlink shared channel ("PDSCH")-system information block ("SIB") transmissions in response to one of multiplexing pattern 2 and multiplexing pattern 3 being used.

In one embodiment, the processor 905 uses extended cyclic prefix ("CP") for orthogonal frequency division multiplexing ("OFDM") symbols in slots where a synchronization signal block ("SSB") is present.

In one embodiment, the processor 905 uses different waveforms for one of a first orthogonal frequency division multiplexing ("OFDM") symbol of one or more of synchronization signal block ("SSB") transmissions and type0-physical downlink control channel ("PDCCH") transmissions in response to multiplexing pattern 3 being used and a last OFDM symbol of one or more of synchronization signal block ("SSB") transmissions and physical downlink shared channel ("PDSCH")-system information block ("SIB") transmissions in response to one of multiplexing pattern 2 and multiplexing pattern 3 being used.

In one embodiment, the processor 905 uses a radio resource control ("RRC") configuration parameter to indicate to the UE device the type and a length of gap that is inserted between the contiguous transmissions that are scheduled on different beams.

In one embodiment, the processor 905 introduces an additional gap between the contiguous transmissions such that a total gap becomes equal to or greater than a beam switching delay in response to a cyclic prefix ("CP") length not being sufficient to accommodate the beam switching delay.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to inserting beam switching gaps between beam transmissions. For example, the memory 910 may store parameters, configurations, resource assignments, policies, and the like, as described above. In certain embodiments, the memory 910 also stores program code and related data, such as an operating system or other controller algorithms operating on the network apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the network apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 includes at least transmitter 930 and at least one receiver 935. One or more transmitters 930 may be used to communicate with the UE, as described herein. Similarly, one or more receivers 935 may be used to communicate with network functions in the NPN, PLMN and/or RAN, as described herein. Although only one transmitter 930 and one receiver 935 are illustrated, the network apparatus 900 may have any suitable number of transmitters 930 and receivers 935. Further, the transmitter(s) 930 and the receiver(s) 935 may be any suitable type of transmitters and receivers.

Figure 10:
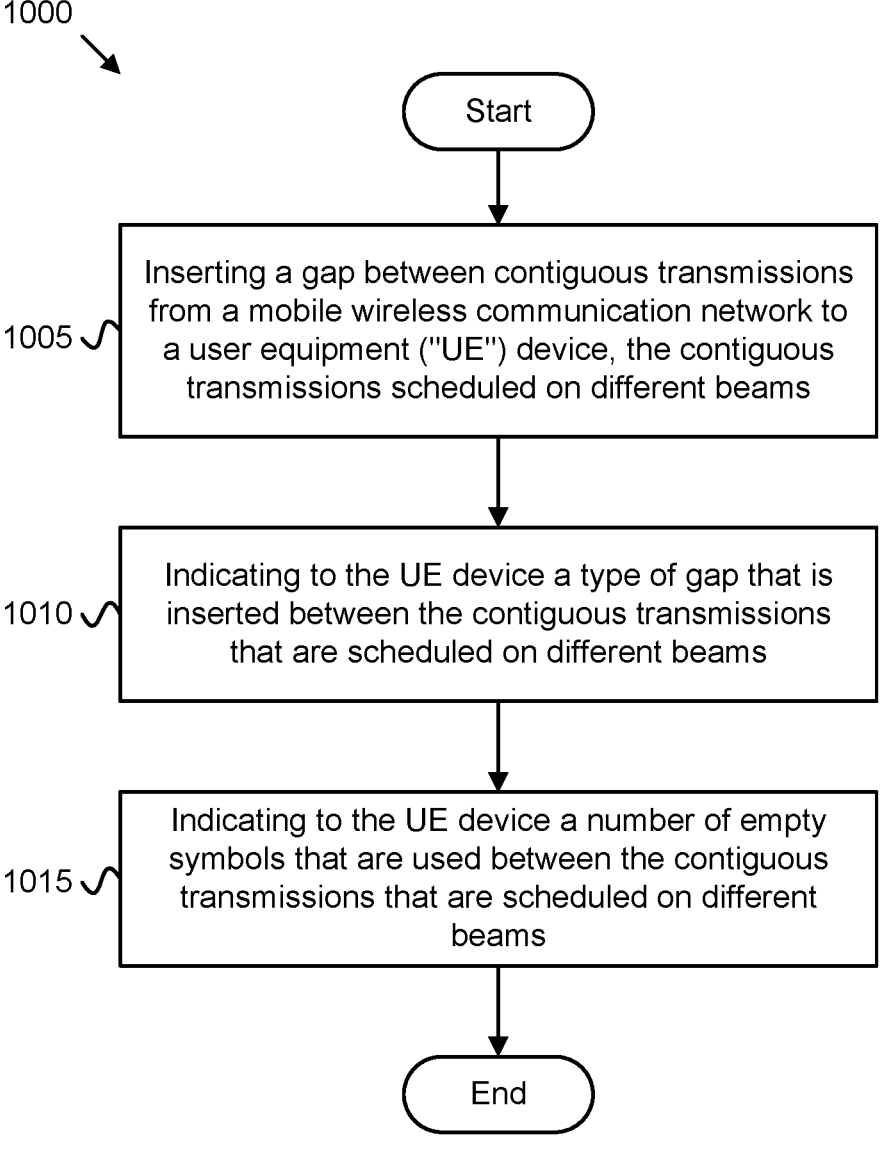
FIG. 10 is a flowchart diagram illustrating one embodiment of a method for inserting beam switching gaps between beam transmissions.

FIG. 10 is a flowchart diagram of a method 1000 for inserting beam switching gaps between beam transmissions. The method 1000 may be performed by a RAN node, such as the base unit 121, the RAN node 210, or gNB, described above and/or the network equipment apparatus 900. In some embodiments, the method 1000 may be performed by a processor executing program code, for example, a microcontroller, a microprocessor, a CPU, a GPU, an auxiliary processing unit, a FPGA, or the like.

The method 1000, in one embodiment, includes inserting 1005 a gap between contiguous transmissions from a mobile wireless communication network to a user equipment ("UE") device, the contiguous transmissions scheduled on different beams.

The method 1000, in one embodiment, includes indicating 1010 to the UE device a type of gap that is inserted between the contiguous transmissions that are scheduled on different beams. In one embodiment, the method 1000 includes indicating to the UE device a number of empty symbols that are used between the contiguous transmissions that are scheduled on different beams, and the method 1000 ends.

Figure 11:
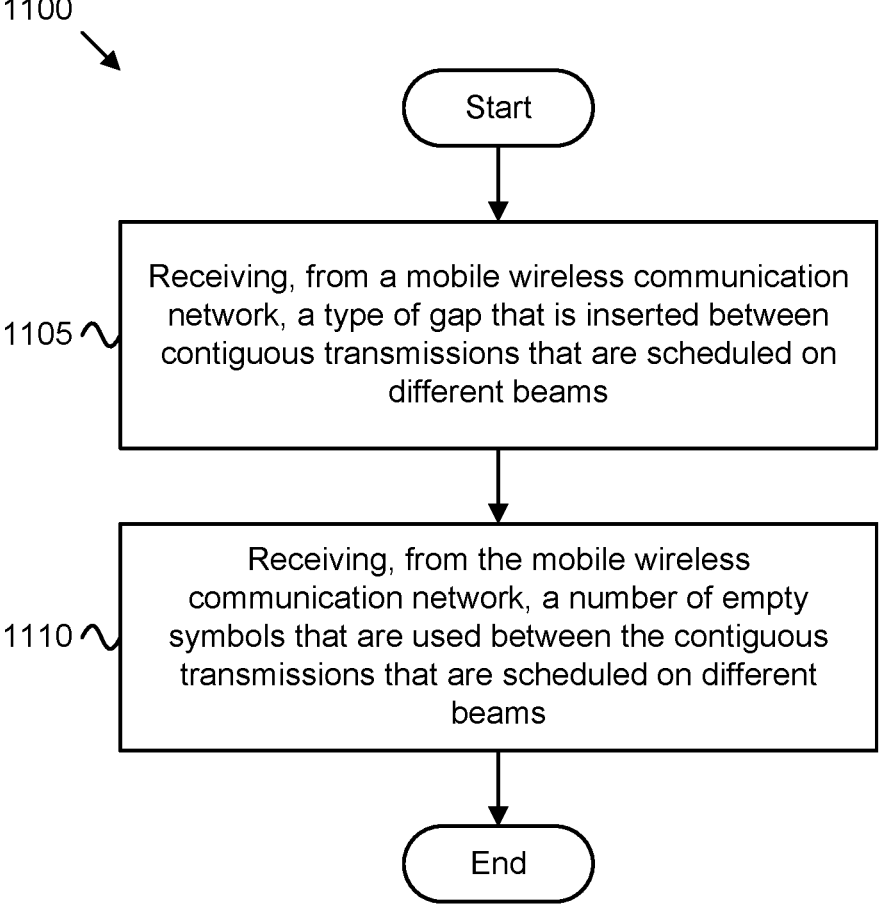
FIG. 11 is a flowchart diagram illustrating one embodiment of a method for inserting beam switching gaps between beam transmissions.

FIG. 11 is a flowchart diagram of a method 1100 for inserting beam switching gaps between beam transmissions. The method 1100 may be performed by a UE as described herein, for example, the remote unit 105, the UE 205 and/or the user equipment apparatus 800. In some embodiments, the method 1100 may be performed by a processor executing program code, for example, a microcontroller, a microprocessor, a CPU, a GPU, an auxiliary processing unit, a FPGA, or the like.

In one embodiment, the method 1100 includes receiving 1105, from a mobile wireless communication network, a type of gap that is inserted between contiguous transmissions that are scheduled on different beams. In one embodiment, the method 1100 includes receiving 1110, from the mobile wireless communication network, a number of empty symbols that are used between the contiguous transmissions that are scheduled on different beams where the type of gap and the number of empty symbols are used for one of initial access transmissions and data and/or control transmissions that are scheduled on different beams and a length of cyclic prefix is shorter than a delay for switching between the different beams.

A first method is disclosed for inserting beam switching gaps between beam transmissions. The first method may be performed by a RAN node, such as the base unit 121, the RAN node 210, or gNB, described above and/or the network equipment apparatus 900. In some embodiments, the first method may be performed by a processor executing program code, for example, a microcontroller, a microprocessor, a CPU, a GPU, an auxiliary processing unit, a FPGA, or the like.

In one embodiment, the first method includes inserting a gap between contiguous transmissions from a mobile wireless communication network to a user equipment ("UE") device, the contiguous transmissions scheduled on different beams, indicating to the UE device a type of gap that is inserted between the contiguous transmissions that are scheduled on different beams, and indicating to the UE device a number of empty symbols that are used between the contiguous transmissions that are scheduled on different beams.

The first method, in one embodiment, includes performing time domain mapping of synchronization signal blocks ("SSBs") where a guard interval of orthogonal frequency division multiplexing ("OFDM") symbols between contiguous SSB candidates remain empty for beam switching when high subcarrier spacing ("SCS") is used.

In one embodiment, the first method includes modifying a downlink frame structure by adding different types of cyclic prefixes ("CPs") to at least one orthogonal frequency division multiplexing ("OFDM") symbol in synchronization signal block ("SSB") slots.

In one embodiment, the first method includes using an extended cyclic prefix ("CP") for a first orthogonal frequency division multiplexing ("OFDM") symbol of one or more of synchronization signal block ("SSB") transmissions and type0-physical downlink control channel ("PDCCH") transmissions in response to multiplexing pattern 3 being used.

In one embodiment, the first method includes using cyclic post-fix for a last orthogonal frequency division multiplexing ("OFDM") symbol of one or more of synchronization signal block ("SSB") transmissions and physical downlink shared channel ("PDSCH")-system information block ("SIB") transmissions in response to one of multiplexing pattern 2 and multiplexing pattern 3 being used.

In one embodiment, the first method includes using extended cyclic prefix ("CP") for orthogonal frequency division multiplexing ("OFDM") symbols in slots where a synchronization signal block ("SSB") is present.

In one embodiment, the first method includes using different waveforms for one of a first orthogonal frequency division multiplexing ("OFDM") symbol of one or more of synchronization signal block ("SSB") transmissions and type0-physical downlink control channel ("PDCCH") transmissions in response to multiplexing pattern 3 being used and a last OFDM symbol of one or more of synchronization signal block ("SSB") transmissions and physical downlink shared channel ("PDSCH")-system information block ("SIB") transmissions in response to one of multiplexing pattern 2 and multiplexing pattern 3 being used.

In one embodiment, the different waveforms comprise at least one of zero-tail ("ZT")-DFT-s-OFDM, unique word ("UW")-DFT-s-OFDM and UW-OFDM waveforms. In one embodiment, the first method includes using a radio resource control ("RRC") configuration parameter to indicate to the UE device the type and a length of gap that is inserted between the contiguous transmissions that are scheduled on different beams.

In one embodiment, the first method includes introducing an additional gap between the contiguous transmissions such that a total gap becomes equal to or greater than a beam switching delay in response to a cyclic prefix ("CP") length not being sufficient to accommodate the beam switching delay.

In one embodiment, the contiguous transmissions comprise one or more of synchronization signal block ("SSB") transmissions, type0-physical downlink control channel ("PDCCH") transmissions, and physical downlink shared channel ("PDSCH")-system information block ("SIB") transmissions. In one embodiment, the contiguous transmissions comprise one or more of physical downlink shared channel ("PDSCH") transmissions, physical uplink shared channel ("PUSCH") transmission, physical downlink control channel ("PDCCH") transmissions, and physical uplink control channel ("PUCCH") transmissions.

A first apparatus is disclosed for inserting beam switching gaps between beam transmissions. The first apparatus may include a RAN node, such as the base unit 121, the RAN node 210, or gNB, described above and/or the network equipment apparatus 900. In some embodiments, the first apparatus includes a processor executing program code, for example, a microcontroller, a microprocessor, a CPU, a GPU, an auxiliary processing unit, a FPGA, or the like.

In one embodiment, the first apparatus includes a processor that inserts a gap between contiguous transmissions from a mobile wireless communication network to a user equipment ("UE") device, the contiguous transmissions scheduled on different beams. The first apparatus includes a transceiver that indicates to the UE device a type of gap that is inserted between the contiguous transmissions that are scheduled on different beams and indicates to the UE device a number of empty symbols that are used between the contiguous transmissions that are scheduled on different beams.

The processor, in one embodiment, performs time domain mapping of synchronization signal blocks ("SSBs") where a guard interval of orthogonal frequency division multiplexing ("OFDM") symbols between contiguous SSB candidates remain empty for beam switching when high subcarrier spacing ("SCS") is used.

In one embodiment, the processor modifies a downlink frame structure by adding different types of cyclic prefixes ("CPs") to at least one orthogonal frequency division multiplexing ("OFDM") symbol in synchronization signal block ("SSB") slots.

In one embodiment, the processor uses an extended cyclic prefix ("CP") for a first orthogonal frequency division multiplexing ("OFDM") symbol of one or more of synchronization signal block ("SSB") transmissions and type0-physical downlink control channel ("PDCCH") transmissions in response to multiplexing pattern 3 being used.

In one embodiment, the processor uses cyclic post-fix for a last orthogonal frequency division multiplexing ("OFDM") symbol of one or more of synchronization signal block ("SSB") transmissions and physical downlink shared channel ("PDSCH")-system information block ("SIB") transmissions in response to one of multiplexing pattern 2 and multiplexing pattern 3 being used.

In one embodiment, the processor uses extended cyclic prefix ("CP") for orthogonal frequency division multiplexing ("OFDM") symbols in slots where a synchronization signal block ("SSB") is present.

In one embodiment, the processor uses different waveforms for one of a first orthogonal frequency division multiplexing ("OFDM") symbol of one or more of synchronization signal block ("SSB") transmissions and type0-physical downlink control channel ("PDCCH") transmissions in response to multiplexing pattern 3 being used and a last OFDM symbol of one or more of synchronization signal block ("SSB") transmissions and physical downlink shared channel ("PDSCH")-system information block ("SIB") transmissions in response to one of multiplexing pattern 2 and multiplexing pattern 3 being used.

In one embodiment, the different waveforms comprise at least one of zero-tail ("ZT")-DFT-s-OFDM, unique word ("UW")-DFT-s-OFDM and UW-OFDM waveforms. In one embodiment, the processor uses a radio resource control ("RRC") configuration parameter to indicate to the UE device the type and a length of gap that is inserted between the contiguous transmissions that are scheduled on different beams.

In one embodiment, the processor introduces an additional gap between the contiguous transmissions such that a total gap becomes equal to or greater than a beam switching delay in response to a cyclic prefix ("CP") length not being sufficient to accommodate the beam switching delay.

In one embodiment, the contiguous transmissions comprise one or more of synchronization signal block ("SSB") transmissions, type0-physical downlink control channel ("PDCCH") transmissions, and physical downlink shared channel ("PDSCH")-system information block ("SIB") transmissions. In one embodiment, the contiguous transmissions comprise one or more of physical downlink shared channel ("PDSCH") transmissions, physical uplink shared channel ("PUSCH") transmission, physical downlink control channel ("PDCCH") transmissions, and physical uplink control channel ("PUCCH") transmissions.

A second method is disclosed for inserting beam switching gaps between beam transmissions. The second method may be performed by a UE as described herein, for example, the remote unit 105, the UE 205 and/or the user equipment apparatus 800. In some embodiments, the second method may be performed by a processor executing program code, for example, a microcontroller, a microprocessor, a CPU, a GPU, an auxiliary processing unit, a FPGA, or the like.

In one embodiment, the second method includes receiving, from a mobile wireless communication network, a type of gap that is inserted between contiguous transmissions that are scheduled on different beams and receiving, from the mobile wireless communication network, a number of empty symbols that are used between the contiguous transmissions that are scheduled on different beams. In one embodiment, the type of gap and the number of empty symbols are used for one of initial access transmissions and data and/or control transmissions that are scheduled on different beams and a length of cyclic prefix is shorter than a delay for switching between the different beams.

A second apparatus is disclosed for inserting beam switching gaps between beam transmissions. The second apparatus may include a UE as described herein, for example, the remote unit 105, the UE 205 and/or the user equipment apparatus 800. In some embodiments, the second apparatus includes a processor executing program code, for example, a microcontroller, a microprocessor, a CPU, a GPU, an auxiliary processing unit, a FPGA, or the like.

In one embodiment, the second apparatus includes a transceiver that receives, from a mobile wireless communication network, a type of gap that is inserted between contiguous transmissions that are scheduled on different beams and receives, from the mobile wireless communication network, a number of empty symbols that are used between the contiguous transmissions that are scheduled on different beams. In one embodiment, the second apparatus includes a processor that uses the type of gap and the number of empty symbols for one of initial access transmissions and data and/or control transmissions that are scheduled on different beams and a length of cyclic prefix is shorter than a delay for switching between the different beams.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network equipment (NE), comprising:

at least one memory; and at least one processor coupled with the at least one memory and configured to cause the NE to:

insert a gap comprising one or more empty orthogonal frequency division multiplexing (OFDM) symbols between contiguous transmissions to a user equipment (UE) that are scheduled on different beams; and indicate to the UE, via a higher layer parameter, a type of gap that is inserted between the contiguous transmissions that are scheduled on different beams;

wherein a number of empty OFDM symbols is determined based on a subcarrier spacing (SCS) of the transmission such that a total gap duration is equal to or greater than a beam switching delay when a cyclic prefix (CP) length is insufficient.

2. The NE of claim 1, wherein the at least one processor is configured to cause the NE to perform time domain mapping of synchronization signal blocks (SSBs) where a guard interval of OFDM symbols between contiguous SSB candidates remain empty for beam switching when a high SCS is used.

3. The NE of claim 1, wherein the at least one processor is configured to cause the NE to modify a downlink frame structure by adding different types of CPs to at least one OFDM symbol in synchronization signal block (SSB) slots.

4. The NE of claim 1, wherein the at least one processor is configured to cause the NE to use an extended CP for a first OFDM symbol of one or more of synchronization signal block (SSB) transmissions and type0-physical downlink control channel (PDCCH) transmissions in response to multiplexing pattern 3 being used.

5. The NE of claim 1, wherein the at least one processor is configured to cause the NE to use cyclic post-fix for a last OFDM symbol of one or more of synchronization signal block (SSB) transmissions and physical downlink shared channel (PDSCH)-system information block (SIB) transmissions in response to one of multiplexing pattern 2 and multiplexing pattern 3 being used.

6. The NE of claim 1, wherein the at least one processor is configured to cause the NE to use different waveforms for one of:

a first OFDM symbol of one or more of synchronization signal block (SSB) transmissions and type0-physical downlink control channel (PDCCH) transmissions in response to multiplexing pattern 3 being used; and a last OFDM symbol of one or more of SSB transmissions and physical downlink shared channel (PDSCH)-system information block (SIB) transmissions in response to one of multiplexing pattern 2 and multiplexing pattern 3 being used.

7. The NE of claim 6, wherein the different waveforms comprise at least one of zero-tail (ZT)-DFT-s-OFDM, unique word (UW)-DFT-s-OFDM and UW-OFDM waveforms.

8. The NE of claim 1, wherein the at least one processor is configured to cause the NE to use a radio resource control (RRC) configuration parameter to indicate to the UE the type and a length of gap that is inserted between the contiguous transmissions that are scheduled on different beams.

9. The NE of claim 1, wherein the at least one processor is configured to cause the NE to introduce an additional gap between the contiguous transmissions such that a total gap becomes equal to or greater than a beam switching delay in response to a CP length not being sufficient to accommodate the beam switching delay.

10. The NE of claim 1, wherein the contiguous transmissions comprise one or more of synchronization signal block (SSB) transmissions, type0-physical downlink control channel (PDCCH) transmissions, and physical downlink shared channel (PDSCH)-system information block (SIB) transmissions.

11. The NE of claim 1, wherein the contiguous transmissions comprise one or more of physical downlink shared channel (PDSCH) transmissions, physical uplink shared channel (PUSCH) transmission, physical downlink control channel (PDCCH) transmissions, and physical uplink control channel (PUCCH) transmissions.

12. A method, comprising:

inserting a gap comprising one or more empty orthogonal frequency division multiplexing (OFDM) symbols between contiguous transmissions to a user equipment (UE) that are scheduled on different beams; and indicating to the UE, via a higher layer parameter, a type of gap that is inserted between the contiguous transmissions that are scheduled on different beams;

wherein a number of empty OFDM symbols is determined based on a subcarrier spacing (SCS) of the transmission such that a total gap duration is equal to or greater than a beam switching delay when a cyclic prefix (CP) length is insufficient.

13. The method of claim 12, wherein the contiguous transmissions comprise one or more of synchronization signal block (SSB) transmissions, type0-physical downlink control channel (PDCCH) transmissions, and physical downlink shared channel (PDSCH)-system information block (SIB) transmissions.

14. The method of claim 12, wherein the contiguous transmissions comprise one or more of physical downlink shared channel (PDSCH) transmissions, physical uplink shared channel (PUSCH) transmission, physical downlink control channel (PDCCH) transmissions, and physical uplink control channel (PUCCH) transmissions.

15. The method of claim 12, further comprising performing time domain mapping of synchronization signal blocks (SSBs) where a guard interval of OFDM symbols between contiguous SSB candidates remain empty for beam switching when a high (SCS) is used.

16. The method of claim 12, further comprising modifying a downlink frame structure by adding different types of (CPs) to at least one OFDM symbol in synchronization signal block (SSB) slots.

17. The method of claim 12, further comprising using an extended CP for a first OFDM symbol of one or more of synchronization signal block (SSB) transmissions and type0-physical downlink control channel (PDCCH) transmissions in response to multiplexing pattern 3 being used.

18. The method of claim 12, further comprising using cyclic post-fix for a last OFDM symbol of one or more of synchronization signal block (SSB) transmissions and physical downlink shared channel (PDSCH)-system information block (SIB) transmissions in response to one of multiplexing pattern 2 and multiplexing pattern 3 being used.

19. The method of claim 12, further comprising using different waveforms for one of:

a first OFDM symbol of one or more of synchronization signal block (SSB) transmissions and type0-physical downlink control channel (PDCCH) transmissions in response to multiplexing pattern 3 being used; and a last OFDM symbol of one or more of SSB transmissions and physical downlink shared channel (PDSCH)-system information block (SIB) transmissions in response to one of multiplexing pattern 2 and multiplexing pattern 3 being used.

20. A user equipment (UE), comprising:

at least one memory; and at least one processor coupled with the at least one memory and configured to cause the UE to:

receive, via a higher layer parameter, a type of gap that is inserted between contiguous transmissions that are scheduled on different beams; and use the type of gap and a number of empty symbols for one of initial access transmissions and data and/or control transmissions that are scheduled on different beams and a length of cyclic prefix is shorter than a delay for switching between the different beams;

wherein a number of empty orthogonal frequency division multiplexing (OFDM) symbols is determined based on a subcarrier (SCS) spacing of the transmission such that a total gap duration is equal to or greater than a beam switching delay when a cyclic prefix (CP) length is insufficient.

\* \* \* \* \*